(12) United States Patent
Kumar et al.

(10) Patent No.: US 12,205,319 B2
(45) Date of Patent: Jan. 21, 2025

(54) FRAMEWORK FOR 3D OBJECT DETECTION AND DEPTH PREDICTION FROM 2D IMAGES

(71) Applicant: Ridecell, Inc., San Francisco, CA (US)

(72) Inventors: Arun Kumar Chockalingam Santha Kumar, Milpitas, CA (US); Paridhi Singh, San Jose, CA (US); Gaurav Singh, San Jose, CA (US)

(73) Assignee: Ridecell, Inc., San Francisco, CA (US)

( * ) Notice: Subject to any disclaimer, the term of this patent is extended or adjusted under 35 U.S.C. 154(b) by 372 days.

(21) Appl. No.: 17/689,530

(22) Filed: Mar. 8, 2022

(65) Prior Publication Data

US 2022/0284623 A1    Sep. 8, 2022

Related U.S. Application Data

(60) Provisional application No. 63/158,093, filed on Mar. 8, 2021.

(51) Int. Cl.
*G06T 7/73*    (2017.01)
*B60W 60/00*    (2020.01)
(Continued)

(52) U.S. Cl.
CPC ........... *G06T 7/73* (2017.01); *B60W 60/0015* (2020.02); *G01S 17/42* (2013.01); *G01S 17/89* (2013.01);
(Continued)

(58) Field of Classification Search
CPC . G06T 7/73; G06T 7/521; G06T 2207/10028; G06T 2207/20081; G06T 2207/20084; G06T 2207/30252; G06T 2207/10016; G06T 2207/30196; G06T 2207/30261; G06T 7/74; B60W 60/0015;
(Continued)

(56) References Cited

U.S. PATENT DOCUMENTS 10,976,753 B2 *    4/2021    Zhao ..................... G01S 3/7864
2018/0137644 A1 *    5/2018    Rad ....................... G06V 10/242
(Continued)

OTHER PUBLICATIONS

PCT Application Serial No. PCT/US22/19354, International Search Report and Written Opinion dated Jul. 12, 2022.

*Primary Examiner* — Ali Bayat
(74) *Attorney, Agent, or Firm* — Larry E. Henneman, Jr.; Henneman & Associates, PLC

(57) ABSTRACT

Multi-object tracking in autonomous vehicles uses both camera data and LiDAR data for training, but not LiDAR data at query time. Thus, no LiDAR sensor is on a piloted autonomous vehicle. Example systems and methods rely on camera 2D object detections alone, rather than 3D annotations. Example systems/methods utilize a single network that is given a camera image as input and can learn both object detection and dense depth in a multimodal regression setting, where the ground truth LiDAR data is used only at training time to compute depth regression loss. The network uses the camera image alone as input at test time (i.e., when deployed for piloting an autonomous vehicle) and can predict both object detections and dense depth of the scene. LiDAR is only used for data acquisition and is not required for drawing 3D annotations or for piloting the vehicle.

50 Claims, 14 Drawing Sheets

(51) Int. Cl.
  *G01S 17/42* (2006.01)
  *G01S 17/89* (2020.01)
  *G06N 5/02* (2023.01)
  *G06T 7/521* (2017.01)
  *G01S 17/931* (2020.01)

(52) U.S. Cl.
  CPC ............ *G06N 5/027* (2013.01); *G06T 7/521* (2017.01); *B60W 2420/408* (2024.01); *B60W 2554/4029* (2020.02); *B60W 2554/4041* (2020.02); *G01S 17/931* (2020.01); *G06T 2207/10028* (2013.01); *G06T 2207/20081* (2013.01); *G06T 2207/20084* (2013.01); *G06T 2207/30252* (2013.01)

(58) Field of Classification Search
  CPC ... B60W 2420/408; B60W 2554/4029; B60W 2554/4041; G01S 17/42; G01S 17/89; G01S 17/931; G01S 7/4808; G06N 5/027; G06N 3/0464; G06N 3/084; G06N 3/09
  USPC .......................................................... 382/103
  See application file for complete search history.

(56) References Cited

U.S. PATENT DOCUMENTS

| | | | |
|---|---|---|---|
| 2018/0268601 A1* | 9/2018 | Rad | G06V 20/647 |
| 2018/0365888 A1* | 12/2018 | Satzoda | G05D 1/0251 |
| 2020/0125845 A1* | 4/2020 | Hess | G06V 20/20 |
| 2020/0225673 A1 | 7/2020 | Ebrahimi Afrouzi et al. | |
| 2021/0063578 A1 | 3/2021 | Wekel et al. | |
| 2021/0365707 A1* | 11/2021 | Mao | H04N 23/683 |

* cited by examiner

FRAMEWORK FOR 3D OBJECT DETECTION AND DEPTH PREDICTION FROM 2D IMAGES

RELATED CASES

The present invention claims priority to U.S. Provisional Patent Application No. 63/158,093, filed on Mar. 8, 2021 by at least one common inventor and entitled "A Framework for 3D Object Detection and Depth Prediction from 2D Images", which is incorporated by reference herein in its entirety.

BACKGROUND OF THE INVENTION

Field of the Invention

This invention relates generally to autonomous vehicles, and more particularly to perception for autonomous vehicles and also to driving scenario extraction methods from raw camera data.

Description of the Background Art

Autonomous vehicles, i.e. vehicles that do not require a human driver, are being rapidly developed. Autonomous vehicles include systems (e.g. sensors) for detecting other vehicles, road markings, road signs, pedestrians, and other relevant objects in their surroundings. Data from these sensors is input into an onboard computer system capable of directing the vehicle's movement based on the data received from the sensors. The onboard computer system provides output to the vehicle's controls in order to cause the vehicle to accelerate, decelerate, brake, steer, reverse, etc. The onboard computer must determine the most appropriate maneuvers based on the input from the sensors in order to, for example, avoid collisions, obey traffic laws, etc.

Autonomous vehicles are additionally equipped with location determining systems (e.g. global positioning systems (GPS) receivers) and wireless communications systems (e.g. cellular modems). These systems are utilized to determine the location of the vehicle, communicate the location of the vehicle (if necessary), and receive route instructions based at least in part on the location of the vehicle. The route instructions are considered (in addition to input from the sensors) by the onboard computer in order to determine the most appropriate maneuvers for traveling to a desired location.

Piloting autonomous vehicles requires determining the 3D position and orientation of objects in a scene. The problem of making this determination is one of the central problems of computer vision. A wide variety of applications, such as robotics, autonomous driving, etc. rely heavily on accurate 3D predictions of objects in order to make decisions on how to navigate through a scene. LiDAR sensors are active sensors that obtain 3D positions of objects in a scene. While LiDAR sensors are becoming an integral part of autonomous driving systems, they are still quite expensive and, therefore, difficult to scale.

SUMMARY

Various example systems and example methods for determining the positions of objects in a three-dimensional (3-D) space using a two-dimensional image of the space are disclosed.

An example method for estimating a three-dimensional (3-D) location of an object captured in a two-dimensional (2-D) image includes acquiring position data, acquiring a 2-D image, associating the position data and the 2-D image, providing a machine learning framework, using the associated position data and 2-D image to train the machine learning framework, obtaining a subsequent 2-D image, and using the trained machine learning framework to determine the 3-D position of an object. The position data can be indicative of 3-D positions of objects in a space. The 2-D image of the space can include 2-D representations of the objects in the space. Associating the position data and the 2-D image can create training data. The training data can be used to train the machine learning framework to create a trained machine learning framework capable of determining 3-D positions of target objects represented in 2-D images of target spaces, which include the target objects. The subsequent 2-D image can be of a subsequent space, and the trained machine learning framework can be used to determine a 3-D position of an object in the subsequent space.

In a particular example method, the step of utilizing the trained machine learning framework to determine a 3-D position of an object in the subsequent space can include providing the subsequent 2-D image to a first portion of the trained machine learning framework configured to encode the subsequent 2-D image to generate an encoded 2-D image, providing the encoded 2-D image to a second portion of the trained machine learning framework configured to determine a 2-D position of the object in the subsequent space, providing the encoded 2-D image to a third portion of the trained machine learning framework configured to estimate a depth of the object within the subsequent space. The particular example method can additionally include combining the determined 2-D position of the object and the determined depth of the object to estimate a 3-D position of the object within the subsequent space.

The first portion of the trained machine learning framework can be configured to generate an encoded tensor based at least in part on the subsequent 2-D image. The step of providing the encoded 2-D image to the second portion of the trained machine learning framework can include providing the encoded tensor to the second portion of the trained machine learning framework. The step of providing the encoded 2-D image to the third portion of the trained machine learning framework can include providing the encoded tensor to the third portion of the trained machine learning framework. In a more particular example method, the first portion of the trained machine learning framework can be a deep learning aggregation network configured to encode image features of the subsequent 2-D image to create encoded image features, and the encoded image features can exist at varying scales.

In example methods, the steps of providing the encoded 2-D image to a second portion of the trained machine learning framework and providing the encoded 2-D image to a third portion of the trained machine learning framework can occur in parallel.

An example method can additionally include determining a 2-D, real-world position of the object in the subsequent space. In the example method, the step of obtaining a subsequent 2-D image of a subsequent space can include capturing the subsequent 2-D image with an image capture device, and the image capture device can be associated with an intrinsic matrix. The intrinsic matrix can represent a relationship between points in an image space of the image capture device and locations in a 3-D world space corresponding to the subsequent space. The step of determining a 2-D, real-world position of the object in the subsequent space can include associating points in the image space of the image capture device with locations in the 3-D world space based at least in part on the intrinsic matrix.

In an example method, the step of combining the 2-D position of the object and the depth of the object to estimate a 3-D position of the object within the subsequent space can include utilizing the Pythagorean theorem to relate the estimated depth of the object, a coordinate of the 2-D position of the object, and a corrected depth of the object. The estimated depth can be a distance between the image capture device and the object as estimated by the third portion of the trained machine learning framework. The corrected depth can be a distance between a first plane and a second plane. The first plane can be perpendicular to an optical axis of the image capture device and intersecting the image capture device. The second plane can be perpendicular to the optical axis and intersecting the object. The depth of the object can represent an estimate of the distance between the image capture device and the object. The step of combining the 2-D position of the object and the depth of the object can include calculating the corrected depth based at least in part on the estimated depth, the coordinate, and the Pythagorean theorem.

In an example method, the step of obtaining a subsequent 2-D image of a subsequent space can include capturing the subsequent image with an image capture device. The image capture device can be coupled to a vehicle. The subsequent 2-D image can be captured at a particular time, and the subsequent 2-D image can be at least partially representative of the surroundings of the vehicle at the particular time.

The trained machine learning framework can be provided to the vehicle. The vehicle can be an autonomous vehicle, and movements of the autonomous vehicle can be informed at least in part by the 3-D position of the object determined by the trained machine learning framework.

In an example method, the step of using the training data to train the machine learning framework can include utilizing the machine learning framework to estimate depths of the objects in the space, and utilizing the machine learning framework to estimate 2-D positions of the objects in the space. The example method can additionally include comparing the estimated depths of the objects to observed depths of the objects obtained from the position data, and can also include comparing the estimated 2-D positions of the objects to observed 2-D positions of the objects obtained from position data. A loss function can then be generated based at least in part on the comparison between the estimated depths of the objects and the observed depths of the objects and based at least in part on the comparison between the estimated 2-D positions of the objects and the observed 2-D positions of the objects. The machine learning framework can then be altered based at least in part on the loss function.

In an example method, the step of altering the machine learning framework based at least in part on the loss function can include calculating a contribution of a node of the machine learning framework to the loss function. The step of altering the machine learning framework based at least in part on the loss function can additionally include altering at least one value corresponding to the node of the machine learning framework based at least in part on the contribution of the node to the loss function.

In example methods, the position data can be light detection and ranging (LiDAR) data.

An example system configured to estimate a three-dimensional (3-D) location of an object captured in a two-dimensional (2-D) image can include a hardware processor and memory. The hardware processor can be configured to execute code, and the code can include a set of native instructions that cause the hardware processor to perform a corresponding set of operations when executed by the hardware processor. The memory can store data and the code. The data can include position data indicative of 3-D positions of objects in a space. The data can additionally include a 2-D image of the space, and the 2-D image can include 2-D representations of the objects in the space. The data can additionally include a subsequent 2-D image of a subsequent space. The code can include a machine learning framework and subsets of the set of native instructions. A first subset of the set of native instructions can be configured to associate the position data and the 2-D image to create training data. A second subset of the set of native instructions can be configured to use the training data to train the machine learning framework to create a trained machine learning framework capable of determining 3-D positions of target objects represented in 2-D images of target spaces including the target objects. A third subset of the set of native instructions can be configured to cause the trained machine learning framework to determine a 3-D position of an object in the subsequent space.

In a particular example system, the third subset of the set of native instructions can be additionally configured to provide the subsequent 2-D image to a first portion of the trained machine learning framework that can be configured to encode the subsequent 2-D image to generate an encoded 2-D image. The third subset of the set of native instructions can be additionally configured to provide the encoded 2-D image to a second portion of the trained machine learning framework that can be configured to determine a 2-D position of the object in the subsequent space. The third subset of the set of native instructions can be additionally configured to provide the encoded 2-D image to a third portion of the trained machine learning framework configured to estimate a depth of the object within the subsequent space, and to combine the 2-D position of the object and the depth of the object to estimate a 3-D position of the object within the subsequent space.

In a more particular example system, the first portion of the trained machine learning framework can be configured to generate an encoded tensor based at least in part on the subsequent 2-D image. The third subset of the set of native instructions can be additionally configured to provide the encoded tensor to the second portion of the trained machine learning framework. The third subset of the set of native instructions can be additionally configured to provide the encoded tensor to the third portion of the trained machine learning framework. Optionally, the first portion of the trained machine learning framework can be a deep learning aggregation network configured to encode image features of the subsequent 2-D image to create encoded image features, and the encoded image features can exist at varying scales.

In example systems, the third subset of the set of native instructions can be additionally configured to provide the encoded 2-D image to the second portion of the trained machine learning framework and to the third portion of the trained machine learning framework in parallel.

An example system can additionally include an image capture device associated with an intrinsic matrix. The code can include a fourth subset of the set of native instructions configured to determine a 2-D, real-world position of the object in the subsequent space. The subsequent 2-D image can be captured by the image capture device. The intrinsic matrix can represent a relationship between points in an image space of the image capture device and locations in a 3-D world space corresponding to the subsequent space. The fourth subset of the set of native instructions can be additionally configured to associate points in the image space of the image capture device with locations in the 3-D world space based at least in part on the intrinsic matrix.

In example systems, the third subset of the set of native instructions can be additionally configured to utilize the Pythagorean theorem to relate the estimated depth of the object, a coordinate of the 2-D position of the object, and a corrected depth of the object. The estimated depth can be a distance between the image capture device and the object as estimated by the third portion of the trained machine learning framework. The corrected depth can be a distance between a first plane and a second plane. The first plane can be perpendicular to an optical axis of the image capture device and can intersect the image capture device. The second plane can be perpendicular to the optical axis and can intersect the object. The depth of the object can represent an estimate of the distance between the image capture device and the object. The third subset of the set of native instructions can be additionally configured to calculate the corrected depth based at least in part on the estimated depth, the coordinate, and the Pythagorean theorem.

An example system can additionally include a vehicle and an image capture device. The image capture device can be coupled to the vehicle. The subsequent 2-D image can be captured by the image capture device at a particular time, and the subsequent 2-D image can be at least partially representative of the surroundings of the vehicle at the particular time. The example system can additionally include a network adapter configured to establish a data connection between the hardware processor and the vehicle. The code can include a fourth subset of the set of native instructions configured to provide the trained machine learning framework to the vehicle. The vehicle can be an autonomous vehicle, and movements of the autonomous vehicle can be informed at least in part by the 3-D position of the object.

In an example system, the second subset of the set of native instructions can be additionally configured to utilize the machine learning framework to estimate depths of the objects in the space and to utilize the machine learning framework to estimate 2-D positions of the objects in the space. The second subset of the set of native instructions can be additionally configured to compare the estimated depths of the objects to observed depths of the objects obtained from the position data and to compare the estimated 2-D positions of the objects to observed 2-D positions of the objects obtained from position data. The second subset of the set of native instructions can be additionally configured to generate a loss function based at least in part on the comparison between the estimated depths of the objects and the observed depths of the objects, and also based at least in part on the comparison between the estimated 2-D positions of the objects and the observed 2-D positions of the objects. The machine learning framework can then be altered based at least in part on the loss function. The second subset of the set of native instructions can be additionally configured to calculate a contribution of a node of the machine learning framework to the loss function and to alter at least one value corresponding to the node of the machine learning framework based at least in part on the contribution of the node to the loss function.

In example systems the position data is light detection and ranging (LiDAR) data.

BRIEF DESCRIPTION OF THE DRAWINGS

The present invention is described with reference to the following drawings, wherein like reference numbers denote substantially similar elements.

DETAILED DESCRIPTION

Figure 1:
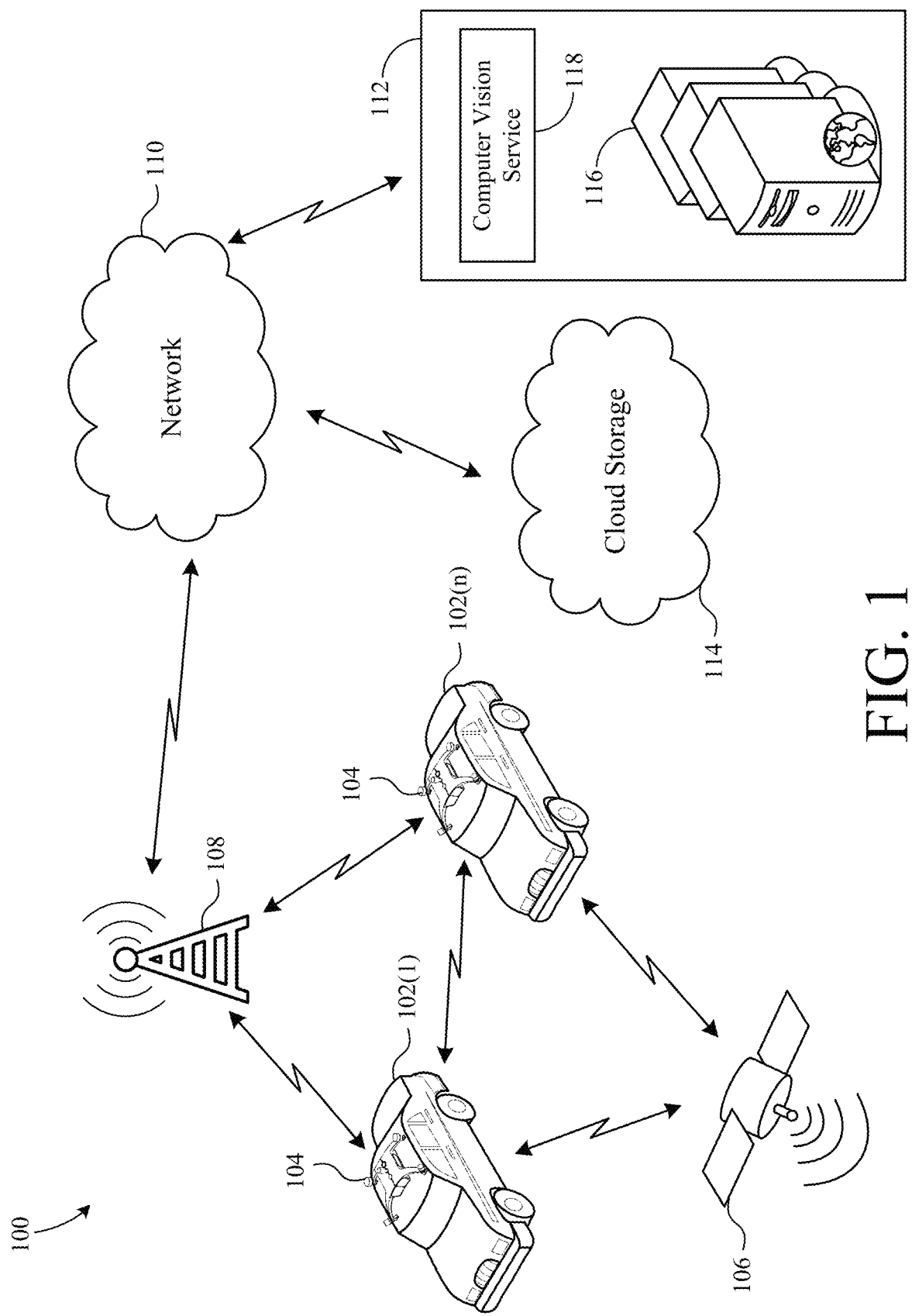
FIG. 1 is a block diagram showing a fleet of vehicles communicating with a remote data computing system.

The present invention overcomes problems associated with the prior art, by providing systems and methods for multi-object tracking in autonomous vehicles that utilize both camera data and LiDAR data for training, but not LiDAR data at query time. As a result, a LiDAR sensor is not required on a piloted autonomous vehicle. In addition, the systems and methods can rely only on camera 2D object detections alone, rather than 3D annotations. Object detection and tracking can also be combined into a single step feedforward pass ensuring spatio-temporally smooth object detections. Example systems and methods utilize a single network that is given a camera image as input and can learn both object detection and dense depth in a multimodal regression setting, where the ground truth LiDAR data is used only at training time to compute depth regression loss. The network uses the camera images alone as input at test time (e.g., when deployed for piloting an autonomous vehicle), because the trained network can predict both object detections and dense depth of the scene from the camera images. In other words, in the proposed method, LiDAR is only used for data acquisition and is not required for drawing 3D annotations (which is a laborious and exorbitant process) or for piloting the vehicle.

Example embodiments of the present invention utilize a single stage architecture that, given a camera image (monocular) as input, learns to regress both 2D object detections and a depth map. Utilizing the depth map and object bounding box, the example methods can obtain the exact depth of the object (or the distance between the camera and object center). An example embodiment is computationally approximately 12× faster than prior methods. One method utilizes image features, which are often rich, dense, and well-textured (unlike depth or LiDAR data) to regress a 2D bounding box and obtain the 3D regressed depth map in a single stage. Thus, the recall rate for smaller objects/regions is expected to be much higher than in previous methods.

An example method additionally bypasses the need for expensive 3D annotations, instead using raw LiDAR data with 2D annotations, which are easy to annotate, reliable, and cheaper to obtain. The network is trained to regress the depth map (of the whole scene) to obtain the distance between the camera center and the object center and, thus, the x, y, and z (i.e., 3-D) position of objects with respect to the camera.

Learning to regress the depth as a function of the whole scene outperforms learning to regress the depth only for selected salient regions or regions that are likely to contain objects. The method improves upon the prior art by regressing the depth of the whole scene (pixel-wise depth values), while computing 2D object detections in a single stage.

In the following description, numerous specific details are set forth (e.g., computer architectures, network architectures, etc.) in order to provide a thorough understanding of the invention. Those skilled in the art will recognize, however, that the invention may be practiced apart from these specific details. In other instances, details of well-known autonomous driving practices (e.g., route planning, vehicle design, equipment placement, etc.) and components have been omitted, so as not to unnecessarily obscure the present invention.

FIG. 1 shows an autonomous vehicle infrastructure 100, including a fleet of autonomous vehicles 102(1-n).

In some embodiments, all or at least a portion of autonomous vehicles 102(1-n) include autonomous driving capabilities and can be driven along streets, roads, highways, etc. by a vehicle computer system without a human driver. In some examples, each autonomous vehicle 102(1-n) can be adjusted (either locally or remotely) from an autonomous mode, where the vehicle is driven by a vehicle computer (shown in FIG. 2), to a non-autonomous mode, where the autonomous vehicle 102(1-n) is driven by a human being. The autonomous vehicle 102(1-n) can be any type of vehicle, including a car, truck, van, or motorcycle that is gas-powered, diesel-powered, hydrogen-powered, or electric and authorized to be driven on roadways. In alternate embodiments, autonomous vehicle 102(1-n) can include any machine intended to transport people or objects from one place to another without the need for a human pilot, including piloted vehicles that have been retrofitted with hardware, software, and/or firmware to allow the vehicle to be autonomously operated.

In the example embodiment, the fleet of autonomous vehicles includes legacy vehicles (i.e., vehicles originally intended to be piloted by a human) that are outfitted with a detachable sensor unit 104 that includes a plurality of sensors (e.g., cameras, radar, LiDAR, etc.). The sensors enable the legacy vehicle to be piloted in the same way as a contemporary autonomous vehicle, by generating and providing data indicative of the surroundings of the vehicle. More information regarding detachable sensor units can be found in U.S. patent application Ser. No. 16/830,755, filed on Mar. 26, 2020 by Anderson et al., which is incorporated herein by reference in its entirety. In alternate embodiments, vehicles 102(1-n) can include any vehicles outfitted with a sensor (e.g., a dashcam) whether or not the vehicles are capable of being piloted autonomously.

For the ease of operation vehicles 102 can be able to identify their own locations. To that end, vehicles 102 can receive signals from global positioning system (GPS) satellites 106, which allow vehicles 102 to determine their location. The determined location is utilized by vehicles 102 to determine intended routes and to navigate along such routes.

Vehicles 102 must also communicate with riders, administrators, technicians, etc. for positioning, monitoring, and/or maintenance purposes. To that end, vehicles 102 also communicate with a wireless communications tower 108 via, for example, a wireless cell modem (not shown) installed in sensor units 104. Vehicles 102 may communicate (via wireless communications tower 108) sensor data, location data, diagnostic data, etc. to relevant entities interconnected via a network 110 (e.g., the Internet). The relevant entities include one or more data centers 112 and a cloud storage provider 114. Communications between vehicles 102 and data center(s) 112 allow the autonomous vehicles to be piloted and/or monitored. Cloud storage provider 114 provides storage for data generated by sensor units 104, the data being potentially useful (e.g., for training, insurance, liability, etc.).

Data center(s) 112 include(s) servers 116 utilized for communicating with vehicles 102. Servers 116 also include at least one computer vision service 118. Computer vision service 118 utilizes data from sensor units 104, as well as additional archived data, publicly available data, etc. in order to inform three-dimensional (3D) object detection by autonomous vehicles 102. In the example embodiment, computer vision service 118 includes a machine learning framework used to develop a computationally efficient model for determining depth information from two-dimensional (2D) camera images. The developed model is then provided to autonomous vehicles 102, facilitating 3D object detection from 2D images, even for those of autonomous vehicles 102 that lack a LiDAR sensor.

In alternate embodiments, depending on the speed and reliability of network connections between autonomous vehicles 102 and data centers 112, computer vision service 118 could receive sensor data from autonomous vehicles 102, utilize the developed model to perform 3D object detection based on the sensor data, and provide multi-object tracking data, prediction data, path planning data, and/or control data back to the vehicle in real-time. Such an embodiment could additionally include emergency, simplified instructions for piloting vehicles 102 in the case of network outages, software/hardware glitches, or any pf a variety of communication disruptions. In an additional embodiment, the model developed by computer vision service 118 can be utilized for extracting driving scenarios from data received from autonomous vehicles 102. The extracted driving scenarios can then be utilized for informing vehicle development, actuarial calculations, etc.

Figure 2:
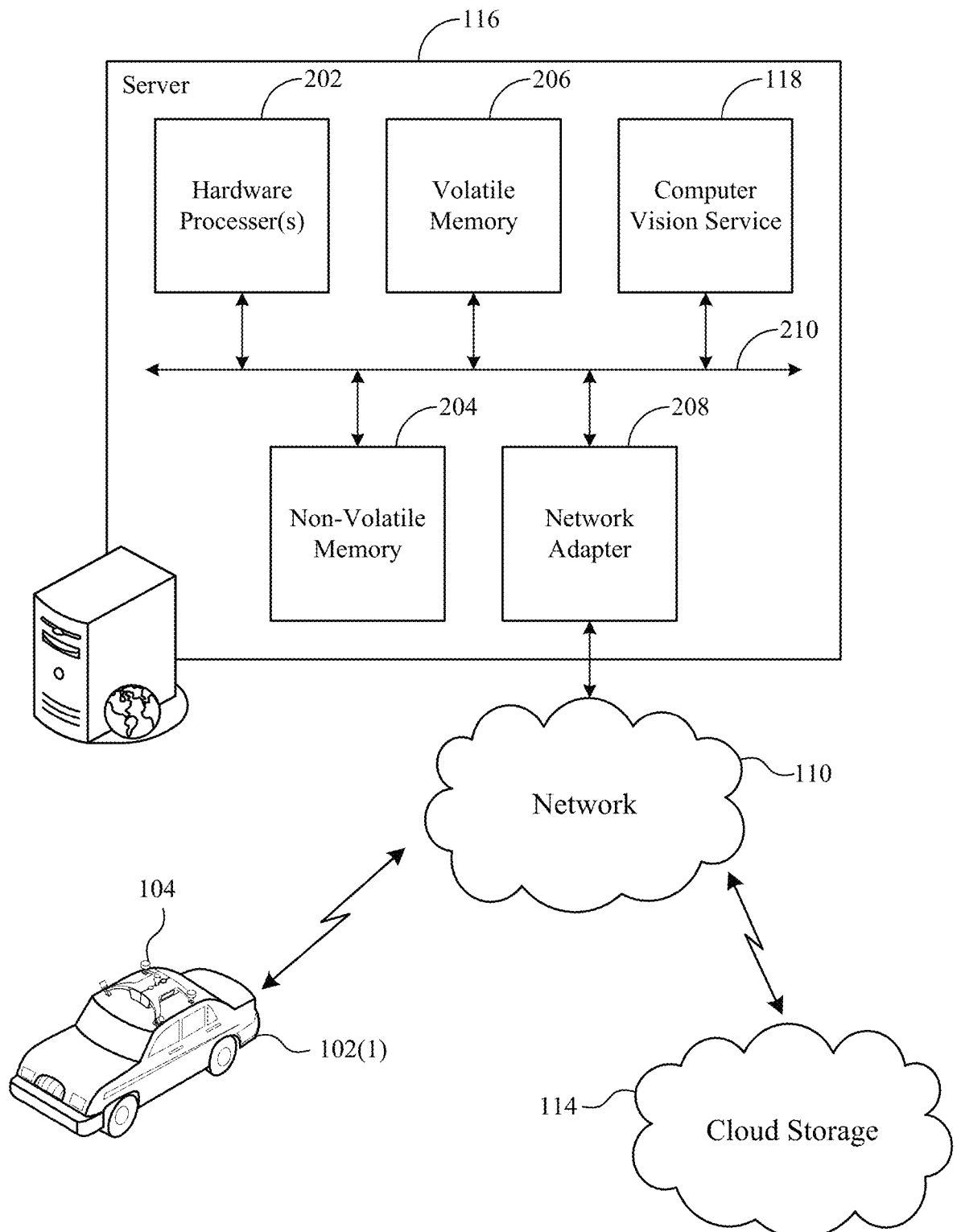
FIG. 2 is a block diagram showing an example embodiment of the server of FIG. 1 in additional detail.

FIG. 2 is a block diagram showing an example one of servers 116 in greater detail. Server 116 includes at least one hardware processor 202, non-volatile memory 204, working memory 206, a network adapter 208, and computer vision service 118 (e.g., depth perception training service), all interconnected and communicating via a system bus 210. Hardware processor 202 imparts functionality to server 116 by executing code stored in any or all of non-volatile memory 204, working memory 206, and computer vision service 118. Hardware processor 202 is electrically coupled to execute a set of native instructions configured to cause hardware processor 202 to perform a corresponding set of operations when executed. In the example embodiment, the native instructions are embodied in machine code that can be read directly by hardware processor 202. Software and/or firmware utilized by server 116 include(s) various subsets of the native instructions configured to perform specific tasks related to the functionality of server 116. Developers of the software and firmware write code in a human-readable format, which is translated into a machine-readable format (e.g., machine code) by a suitable compiler.

Non-volatile memory 204 stores long term data and code including, but not limited to, software, files, databases, applications, etc. Non-volatile memory 204 can include several different storage devices and types, including, but not limited to, hard disk drives, solid state drives, read-only memory (ROM), etc. distributed across data center 112. Hardware processor 202 transfers code from non-volatile memory 204 into working memory 206 and executes the code to impart functionality to various components of server 116. For example, working memory 206 stores code, such as software modules, that when executed provides the described functionality of server 116. Working memory 206 can include several different storage devices and types, including, but not limited to, random-access memory (RAM), non-volatile RAM, flash memory, etc. Network adapter 208 provides server 116 with access (either directly or via a local network) to network 110. Network adapter 208 allows server 116 to communicate with vehicles 102, sensor units 104, and cloud storage 114, among others.

Computer vision service 118 includes software and/or firmware configured for initializing and training a machine learning framework for estimating the depth of various points in a scene captured in a two-dimensional image. Service 118 utilizes processing power, data, storage, etc. from hardware processor 202, non-volatile memory 204, working memory 206, and network adapter 208 to facilitate the development of models, programs, etc. for evaluating the surroundings of autonomous vehicles 102. For example, service 118 may access vehicle data stored in non-volatile memory 204 in order to train a machine learning framework. Service 118 may then store data corresponding to the machine learning framework in volatile memory 206 during training, for example. The details of computer vision (e.g., depth perception training) service 118 will be discussed in greater detail below.

Figure 3:
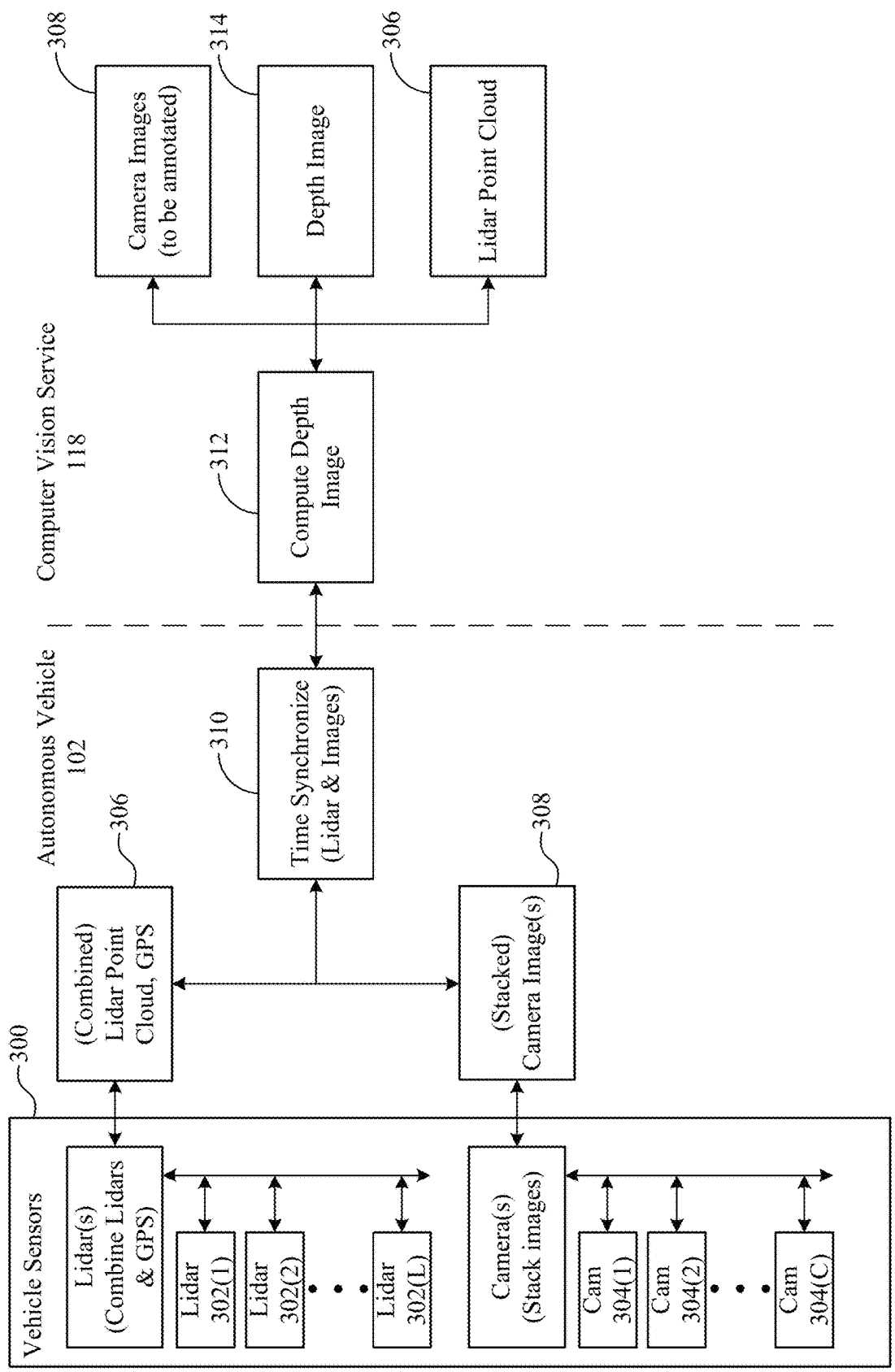
FIG. 3 is a block diagram illustrating data flow between autonomous vehicles and computer vision service of FIG. 1.
Figure 7:
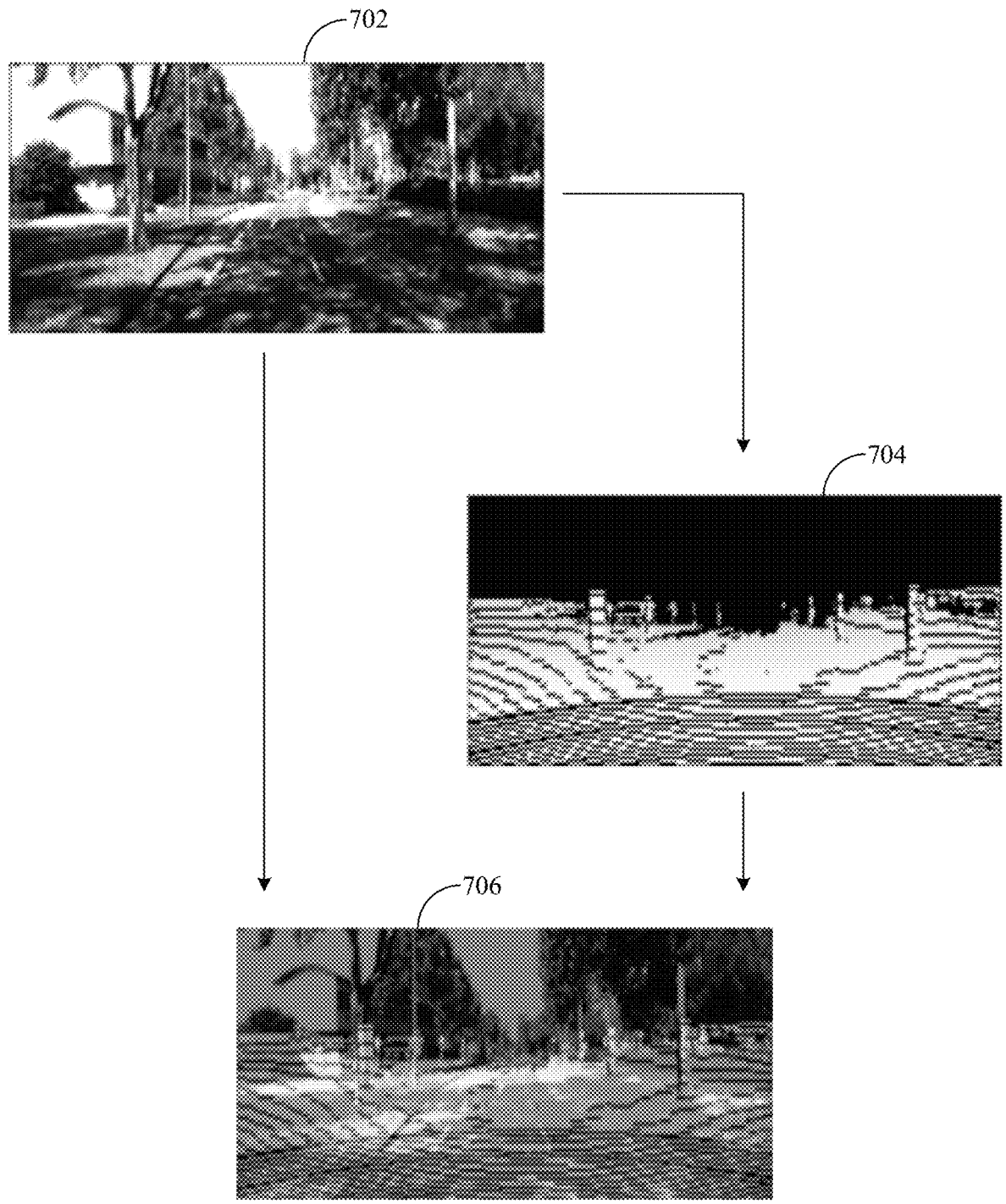
FIG. 7 shows a depth image as generated by depth prediction head of FIG. 6.

FIG. 3 is a block diagram illustrating data flow between autonomous vehicles 102 and computer vision service 118 according to a particular example system. Vehicle sensors 300 include, for example, LiDAR sensors 302(1-L) and cameras 304(1-C). LiDAR sensors 302 are a type of active sensor that directly obtain 3D positions of objects (or sparsely for all regions in a scene). Output from each of LiDAR sensors 302 is combined, along with GPS data, to generate LiDAR point cloud 306. The LiDAR output is combined, for example, according to a spatial calibration of LiDAR sensors 302. Output from each of cameras 304 is combined into stacked camera image(s) 308. The camera output is combined, for example, according to a spatial calibration of cameras 304. LiDAR point cloud 306 and camera image(s) 308 are combined and time synchronized at 310, for use in computing a depth image at 312. Depth image 314 is a camera-image-size depth map in which the LiDAR point cloud is projected to the camera frame (as shown in FIG. 7). Depth image 314 is representative of the surroundings of an autonomous vehicle 102 during a particular time period.

Depth image 314 includes information indicative of the three dimensional positions of objects captured in camera images 308. Depth image 314 is utilized by computer vision service 118 for training a machine learning framework to detect object position and depth from a 2-D camera image alone (without LiDAR point cloud 306). The resulting framework is then utilized for multi-object tracking in the vicinity of autonomous vehicle 102 either in real-time (after framework 312 has been trained) for piloting autonomous vehicle 102 or at a later time for scenario extraction, actuarial purposes, etc. LiDAR point cloud 306, camera images 308, and depth image 314 are provided to the machine learning framework.

Figure 4:
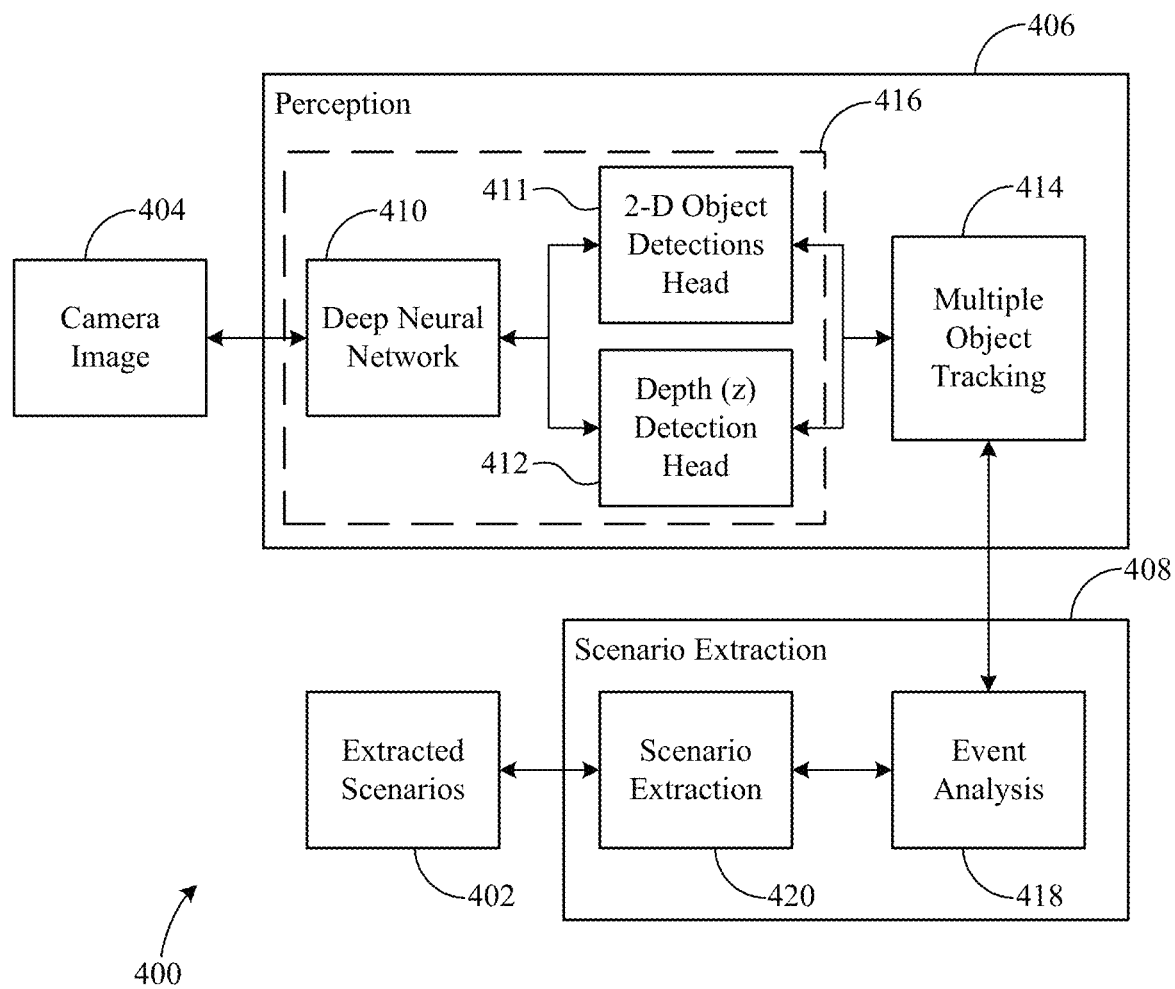
FIG. 4 is a block diagram illustrating a method for utilizing the trained machine learning framework for extracting driving scenarios from a camera image.

FIG. 4 is a block diagram illustrating a method 400 for utilizing the trained machine learning framework for extracting driving scenarios 402 from a camera image 404 captured by a vehicle camera. It should be noted that the present application allows for the use of images captured by non-autonomous vehicles, even vehicles simply outfitted with a dash camera. In the example embodiment, camera image 404 is sourced from a database of video data captured by autonomous vehicles 102.

A perception stage 406 generates 3D object tracking information from camera image 404 and provides the object tracking information to scenario extraction stage 408. Scenario extraction stage 408 utilizes the object tracking information for event analysis and scenario extraction. In other words, method 400 utilizes input camera images 404 to make determinations about what happened around a vehicle during a particular time interval corresponding to image 404.

Perception stage 406 includes a deep neural network 410, a 2D object detections head 411, a depth detection head 412, and a multiple object tracking module 414. Deep neural network 410, 2D object detections head 411, and depth detection head 412 constitute a machine learning framework 416. Deep neural network 410 receives camera image 404 and computes an encoded tensor representation of the input data. This data is then utilized by 2D object detections head 411 and depth detection head 412 to determine the 2D positions and depths, respectively, of objects in the scene. The 2D positions and depths of the objects are then combined to determine 3D positions of objects in image 404. The 3D positions of the objects in image 404 are utilized by multiple object tracking module 414 to compute multi-object tracking within image 404.

Scenario extraction stage 408 includes an event analysis module 418 and a scenario extraction module 420. Modules 418 and 420 utilize the multi-object tracking data to identify scenarios depicted by camera image 404. The output of modules 418 and 420 is the extracted scenarios 402. Examples of extracted scenarios 402 include a vehicle changing lanes in front of the subject vehicle, a pedestrian crossing the road in front of the subject vehicle, a vehicle turning in front of the subject vehicle, etc. Extracted scenarios 402 are utilized for a number of purposes including, but not limited to, training autonomous vehicle piloting software, informing actuarial decisions, etc.

Figure 5:
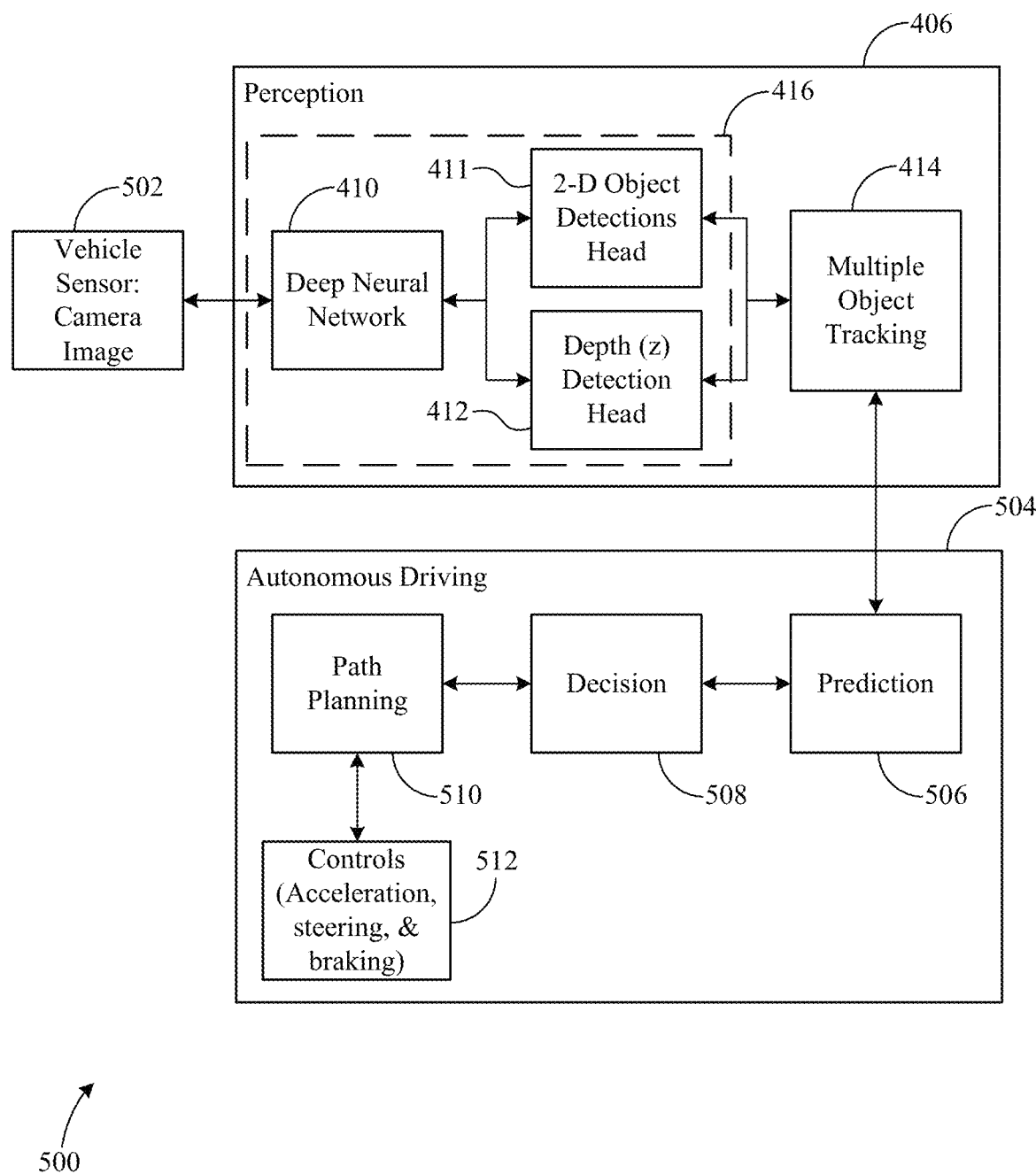
FIG. 5 is a block diagram illustrating a method for utilizing the trained machine learning framework for piloting an autonomous vehicle.

FIG. 5 is a block diagram illustrating a method 500 for utilizing the trained machine learning framework for piloting an autonomous vehicle utilizing a camera image 502 captured by the autonomous vehicle in real-time.

Method 500 utilizes perception stage 406 of method 400, as well as an autonomous driving stage 504. Perception stage 406 receives image 502 and generates multi-object tracking data in the same manner as in method 400. Autonomous driving stage 504 receives the multi-object tracking data and utilizes it to inform the controls of the autonomous vehicle that provided camera image 502.

Autonomous driving stage 504 includes a prediction module 506, a decision module 508, a path planning module 510, and a controls module 512. Prediction module 506 utilizes the multi-object tracking data to predict the future positions and/or velocities of objects in the vicinity of the autonomous vehicle. For example, prediction module 506 may determine that a pedestrian is likely to walk in front of the autonomous vehicle based on the multi-object tracking data. The resultant prediction is utilized by decision module 508, along with other information (e.g., the position and velocity of the autonomous vehicle), to make a decision regarding the appropriate action of the autonomous vehicle. In the example embodiment, the decision made at decision module 508 may be to drive around the pedestrian, if the autonomous vehicle is not able to stop, for example. The decision is utilized by path planning module 510 to determine the appropriate path (e.g. future position and velocity) for the autonomous vehicle to take (e.g. from a current lane and into an adjacent lane). Control module 512 utilizes the determined path to inform the controls of the autonomous vehicle, including the acceleration, steering, and braking of the autonomous vehicle. In the example embodiment, the autonomous vehicle may steer into the adjacent lane while maintaining consistent speed.

It should be apparent, to those of ordinary skill in the art, that information indicative of the 3D positions of objects in the vicinity of an autonomous vehicle (e.g. multi-object tracking) is important for piloting a vehicle safely. In prior art systems, LiDAR sensors are utilized to determine the 3D positions of these objects. However, the present invention makes it possible for an autonomous vehicle to be piloted without a LiDAR sensor, because machine learning framework 416 allows for the determination of the 3D positions of objects in the vicinity of an autonomous vehicle using only images captured by a 2D camera. This provides a significant advantage over the prior art, because LiDAR sensors are significantly more expensive than cameras. Additionally, LiDAR sensors require calibration with camera sensors, representing an additional expense in utilizing LiDAR sensors with autonomous vehicles. This cost savings is realized in the initial manufacturing of autonomous vehicles and during periodic maintenance. Eliminating the need for LiDAR sensors additionally eliminates at least one potential point of failure for autonomous driving perception algorithms.

A number of the modules of FIGS. 4 and 5, including, but not limited to, scenario extraction module 420, path/motion planning module 510 and multiple object tracking module 414 do not always require complete 3D annotations (z, orientation, and length of the bounding box). The results of these modules can be achieved using just the 3D object positions (x, y, and z), because the orientations of moving objects can be obtained by retrospectively modeling the motion of the respective objects. Thus, the proposed method reduces full 3D annotation requirements to simply 2D (with the use of raw LiDAR data used efficiently) and depth (z). The 2D annotations are inexpensive and readily available as opposed to exorbitantly priced and yet challenging LiDAR-based 3D annotations.

An additional benefit of the present invention is the improved scalability of the proposed methods. The proposed methods can be easily scaled across a large set of object classes. 3D object annotations are often restricted to a small set of object classes, where classes with smaller objects, surface-like objects, and/or textured regions cannot be annotated via 3D (LiDAR) annotations. The disclosed method relies on 2D annotations and raw depth data and can be efficiently scaled up to multiple classes.

Figure 6A:
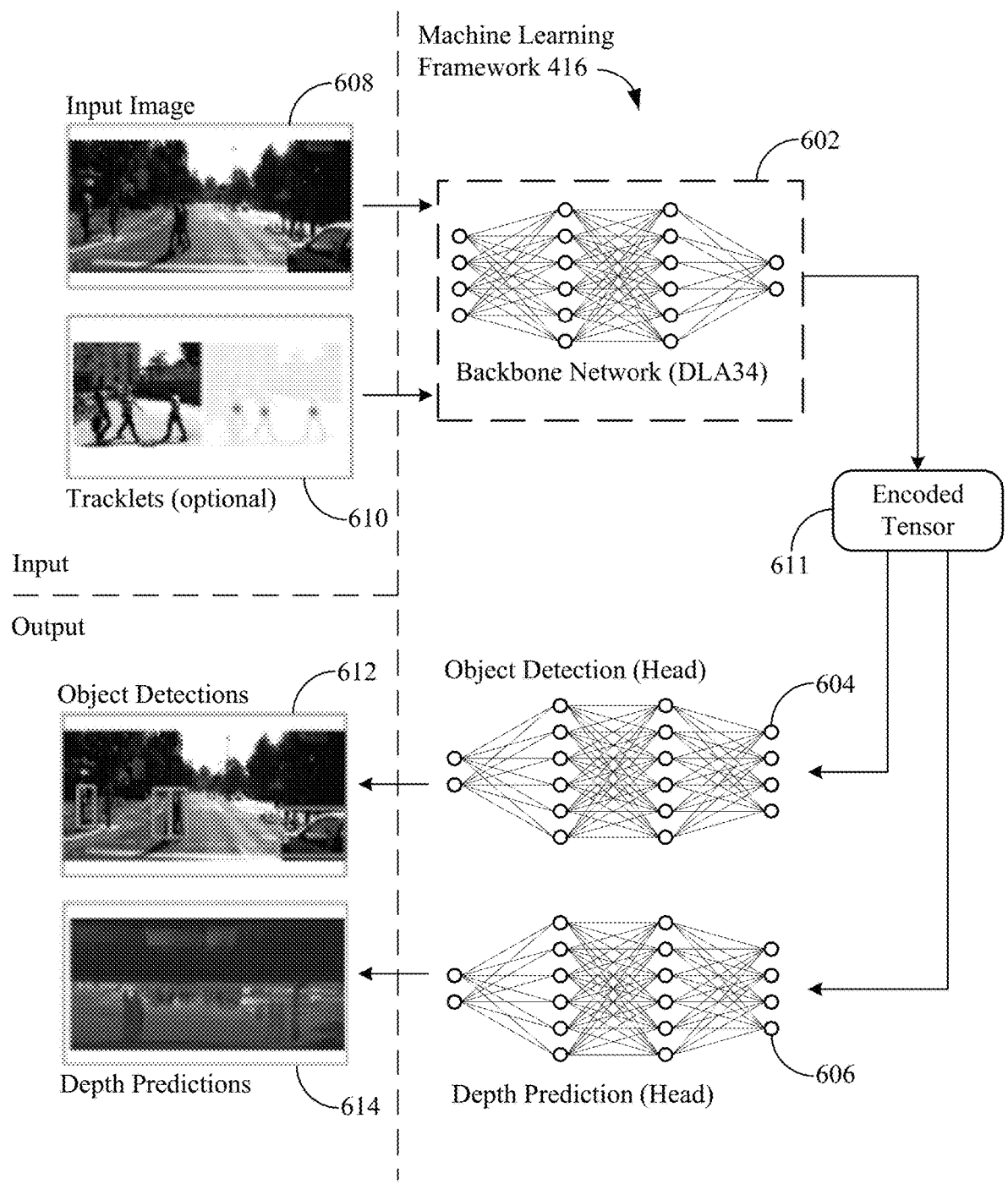
FIG. 6A is a data flow diagram illustrating the machine learning framework of FIG. 4 in greater detail.

FIG. 6A is a data flow diagram illustrating machine learning framework 416 in greater detail. Machine learning framework 416 includes a backbone network 602, an object detection head 604, and a depth prediction head 606. Backbone network 602 is based on Deep Layer Aggregation (e.g., DLA34) and has deformable convolutional layers. Backbone network 602 encodes an input image 608 and provides the encoded image to heads 604 and 606 for object detection and depth prediction, respectively. The use of tracklets 610 is an additional, optional feature. An example method includes an built-in tracking pipeline in order to smooth out the object detections.

Image(s) 608 is a monocular video sequence of N frames, which are used to derive 2D object detections (represented as bounding boxes) as ground truth (e.g. annotations). Image(s) 608 is encoded as an input tensor in (NCHW) format, where N is the number of frames, C is the number of channels (e.g., three color channels in an RGB image), H is the height of the image frame in pixels, and W is the width of the image frame in pixels. As an example, five frames of high definition video are encoded as a tensor with dimensions (5, 3, 1080, 1920). This exact format is not necessary and can be altered based on the particular features and/or characteristics of the input images, the backbone network, the object detection and depth prediction heads, etc. Additionally, it may be desirable to perform some preprocessing on the input image and/or the input tensor before input to the backbone network. For example, tracklets could be superimposed on the image prior to forward propagation.

Backbone network 602 receives image(s) 608 (and tracklets 610, if available) and computes an encoded tensor 611, which is a representation of the input data. Due to the effects of the convolutional layers, tensor 611 has different dimensions than the input tensor corresponding to image(s) 608. In a particular example embodiment, encoded tensor 611 has dimensions (N, H/4, W/4, K), where K is between 32 and 1,024. Thus, in this particular embodiment, backbone network 602 transforms image(s) by spatially down sampling the images and producing additional channels. Encoded tensor 611 includes features representative of the input images in lower dimensions (i.e. latent representations). Because backbone network 602 is a deep layer aggregation network, the latent representations exist at varying scales, allowing machine learning framework 416 to identify and predict depths of a wide range of objects.

The inventors have discovered that the DLA34 network is particularly well suited for the role of the backbone network. The DLA34 network is hierarchical and one advantage is that it re-uses features generated in early layers for use in the later layers. Thus, the network preserves the features of the earlier layers, resulting in better identification of features at a wider variety of scales than other networks. However, the DLA34 network is not a necessary component of the machine learning framework. Indeed, an advantage of the machine learning framework is the ability to identify and predict depths of objects represented in an encoded tensor from any machine learning network. Thus, DLA34 can be utilized as long as it is the most effective, but can be replaced as soon as a superior backbone is discovered.

Encoded tensor 611 is then fed through object detection head 604 and depth prediction head 606 in parallel. Object detection head 604 comprises a series of convolutional (or sparse/deformable convolutional) layers followed by regression of bounding boxes in 2D. In other words, head 604 uses keypoint estimation to find the center points of objects and regresses to all other object properties (e.g. 3D location, orientation, pose, etc.). The bounding boxes each correspond to an object and include (x,y) coordinates to identify the center of the object and offsets along x and y to identify the vertical and horizontal edges of the object, respectively. The center point based approach is end-to-end differentiable, simpler, faster, and more accurate than bounding box based detectors. Additionally, this approach achieves the best tradeoff between speed and accuracy.

Similarly, depth prediction head 606 comprises a series of convolutional (or sparse/deformable convolutional) layers and further regresses an image sized depth map. Object detection head 604 and depth prediction head 606 output bounding boxes (x, y, z, and offsets along x and y) 612 and a high resolution depth map 614, respectively.

Figure 6B:
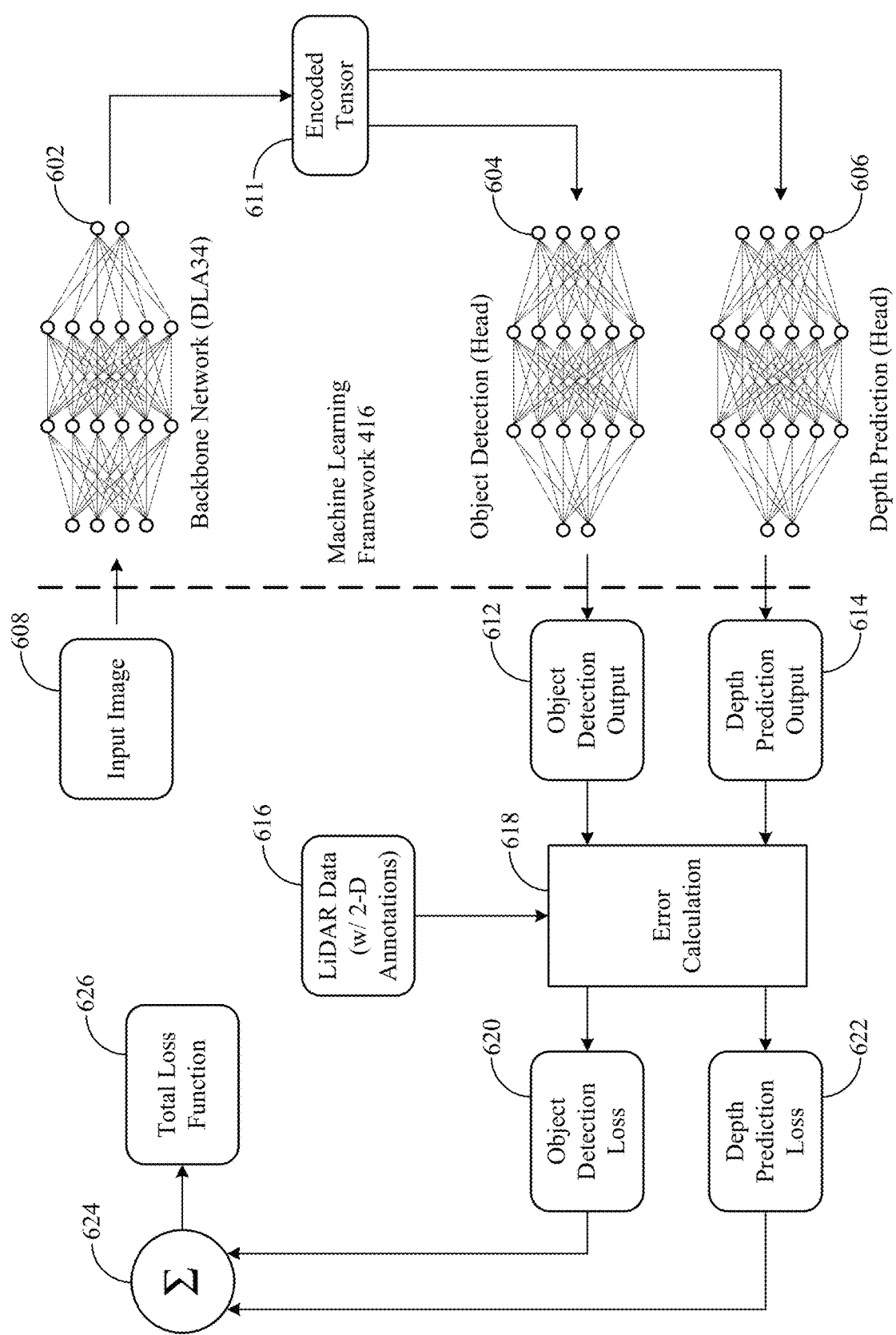
FIG. 6B is a data flow diagram summarizing the calculation of a loss function from the output of the machine learning framework of FIG. 4.
Figure 6C:
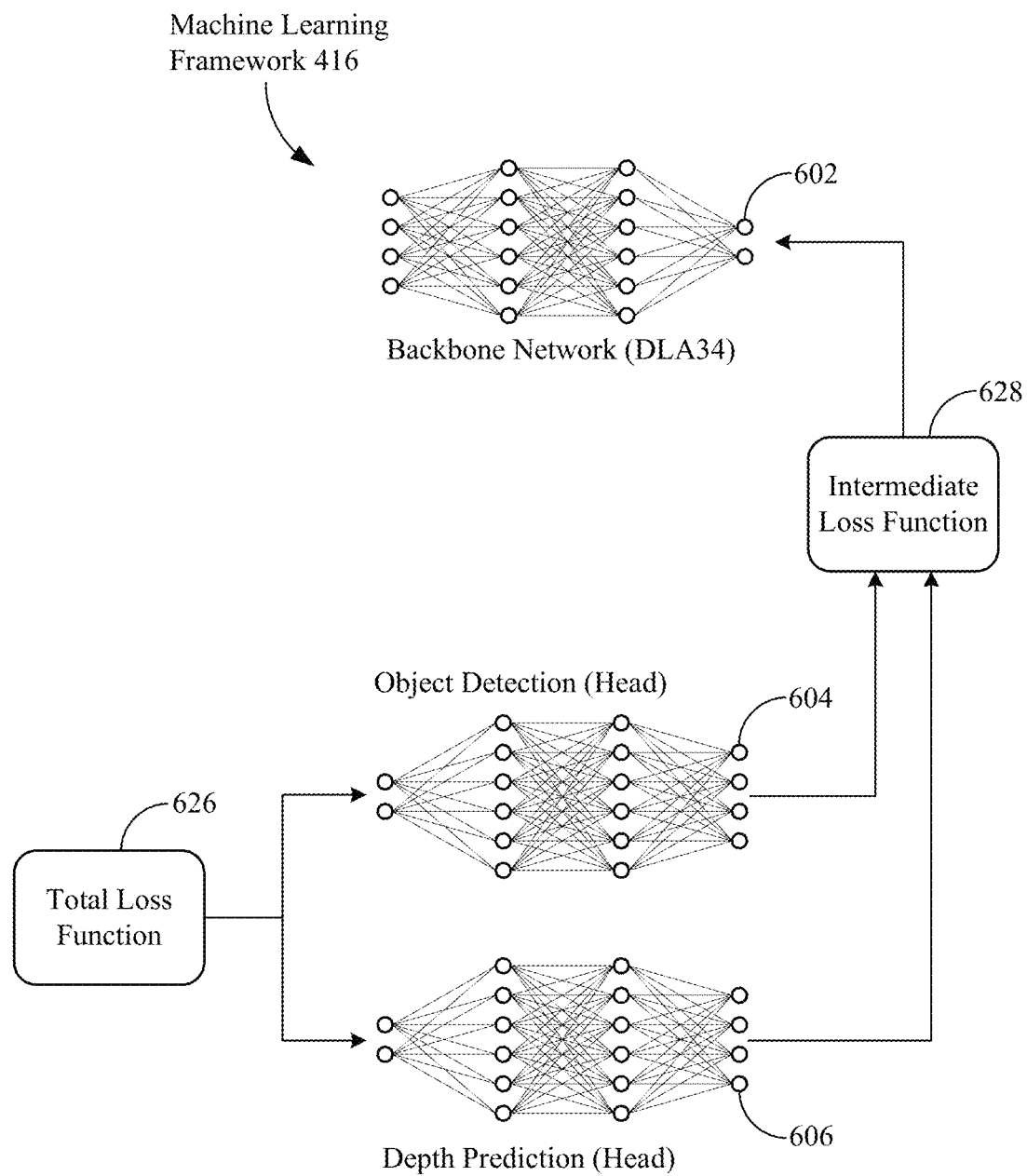
FIG. 6C is a data flow diagram summarizing backpropagation of a total loss function of FIG. 6B through the machine learning framework of FIG. 4.

FIGS. 6B and 6C show the process for training machine learning framework 416. For training, image 608 is taken alongside LiDAR data (sparse or dense). Object detection head 604 is associated with a 2D object detection loss, which is the error between the regressed 2D bounding boxes and ground truth annotations. Similarly, depth prediction head 606 is associated with a depth prediction loss, which is the difference between the regressed depth data and the raw LiDAR data (which represents the ground truth).

FIG. 6B is a data flow diagram summarizing the calculation of a loss function from the output of machine learning framework 416. Object detection output 612 results from the forward pass of encoded tensor 611 through object detection head 604. LiDAR data 616 includes 2-D annotations and, therefore, is utilized to determine the loss for both object detection output 612 and depth prediction output 614. Object detection output 612 is compared to LiDAR data 616 (i.e. the ground truth) by an error calculation module 618, which generates an object detection loss 620 as a function of output 612 and the parameters of object detection head 604. Similarly, module 618 compares depth prediction output 614 to LiDAR data 616 to generate a depth prediction loss 622 as a function of output 614 and the parameters of depth prediction head 606. In an example embodiment, module 618 utilizes a pixel-wise, mean squared error function to calculate losses 620 and 622. In alternate embodiments, any applicable error function can be utilized.

Object detection loss 620 and depth prediction loss 622 are combined by a weighted sum 624 to generate total loss function 626, which is a function of object detection output 612, depth prediction output 614, and the parameters of both head 604 and head 606. In an example embodiment, losses 620 and 622 are weighted evenly to calculate total loss function 626. However, in alternate embodiments, one of losses 620 and 622 could be weighted more heavily than the other. In addition, alternative formulas can be used to combine the losses, depending on the needs of the particular application.

FIG. 6C is a data flow diagram summarizing backpropagation of total loss function 626 through machine learning framework 416. For each forward pass (i.e. each time an image is analyzed by framework 416), total loss function 626 is calculated for that forward pass. A backward pass of total loss function 626 through framework 416 is then completed for each associated forward pass. The backward pass calculates the gradient of total loss function 626 with respect to the parameters of each node in framework 416, and utilizes an optimization algorithm to identify the values of those parameters for which the total loss function 626 is minimized for the particular input image. In the example embodiment, a gradient descent algorithm is utilized for this optimization.

Because total loss function 626 is a function of the output of framework 416, and the output of framework 416 is a function of the values of the parameters of each node in the framework, total loss function 626 is also a function of the values of the parameters of each node in the framework. Therefore, the gradient of total loss function 626 can be calculated with respect to the values of the parameters of each node in the framework, and those parameters can be altered in order to minimize the value of the gradient. Thus, framework 416 "learns" from the errors made in its output during each forward pass. By performing many forward and backward passes (e.g. thousands), during which machine learning framework 416 wrongly predicts the depths of the images and is corrected, framework 416 eventually learns to predict the depths accurately.

After total loss function 626 makes a backward pass through object detection head 604 and depth prediction head 606, the outputs of the first layers of heads 604 and 606 are combined to create an intermediate loss function 628. Intermediate loss function 628 represents the portion of total loss function 626 that can be attributed to backbone network 602. Intermediate loss function 628 makes a backward pass through backbone network 602, which is corrected according to the gradient descent algorithm utilized to correct heads 604 and 606.

Backbone network 602, in an example embodiment, is pre-trained on a plurality of object categories over millions of images and has developed an ability to extract distinctive features from any image. In other words, backbone network 602 is selected for its demonstrated ability to effectively encode relevant image features from the input image. In contrast, heads 604 and 606 are not pre-trained and, therefore, are initialized with random numbers as weights. Therefore, the component of the loss due to backbone network 602 is expected to be relatively small compared to that of heads 604 and 606.

FIG. 7 shows a depth image as generated by depth prediction head 606. FIG. 7 shows a raw camera image 702, which is utilized by machine learning framework 416 to generate a depth image 704. Depth image 704 is overlaid on image 702 to generate an overlay image 706 for visualization.

Figure 8:
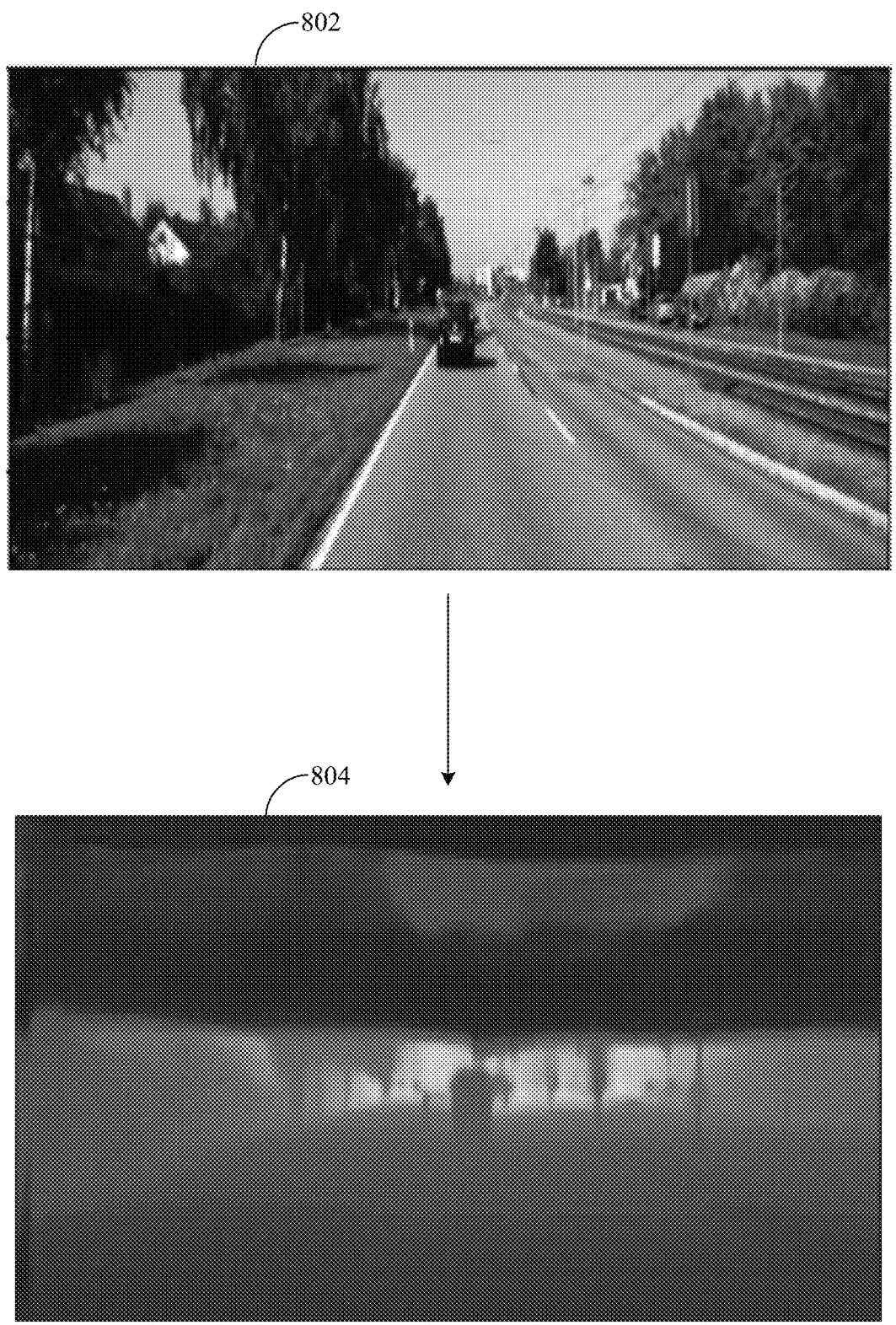
FIG. 8 shows an example of qualitative results of an example embodiment.
Figure 9:
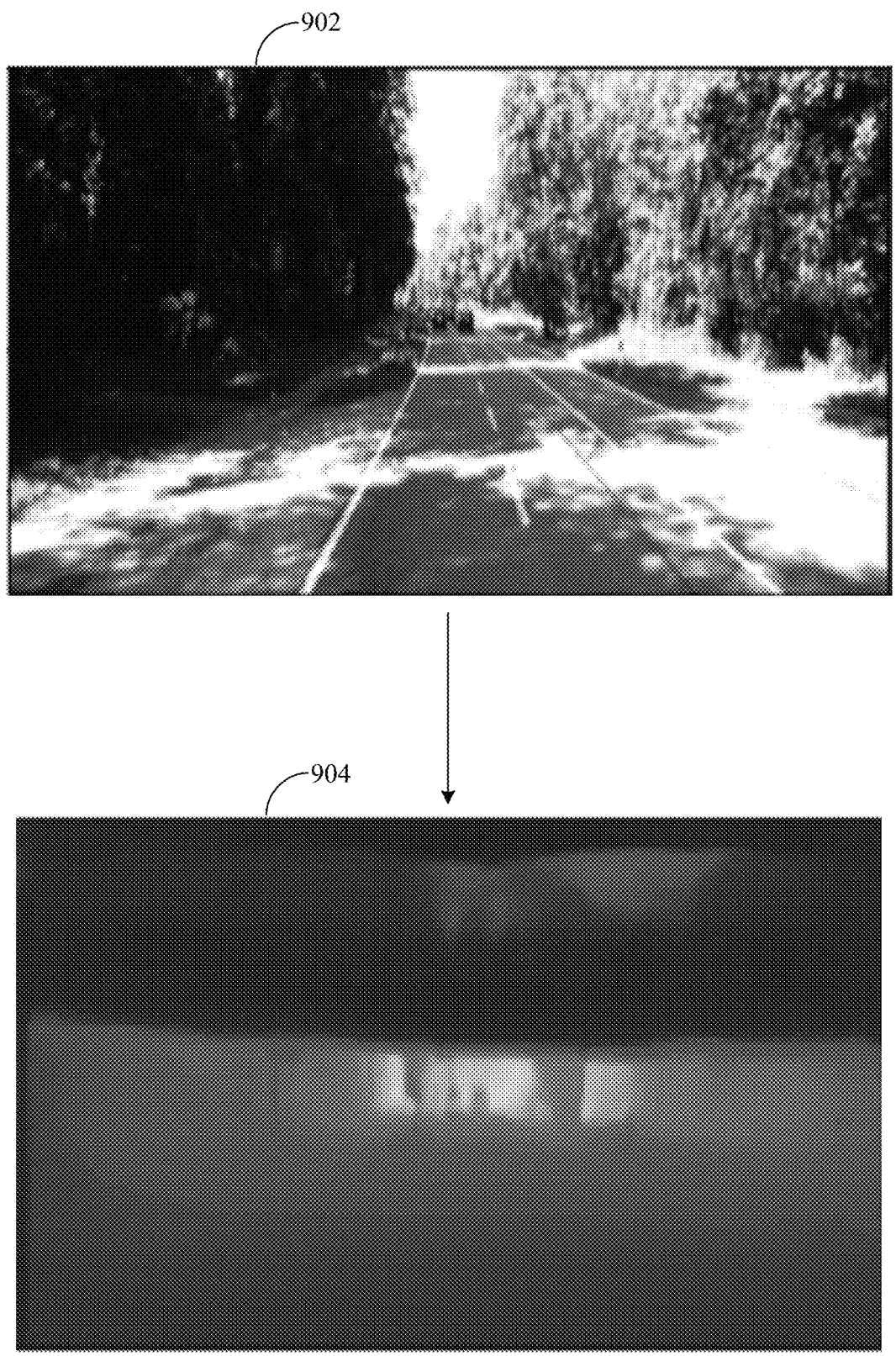
FIG. 9 shows another example of qualitative results of an example embodiment.
Figure 10:
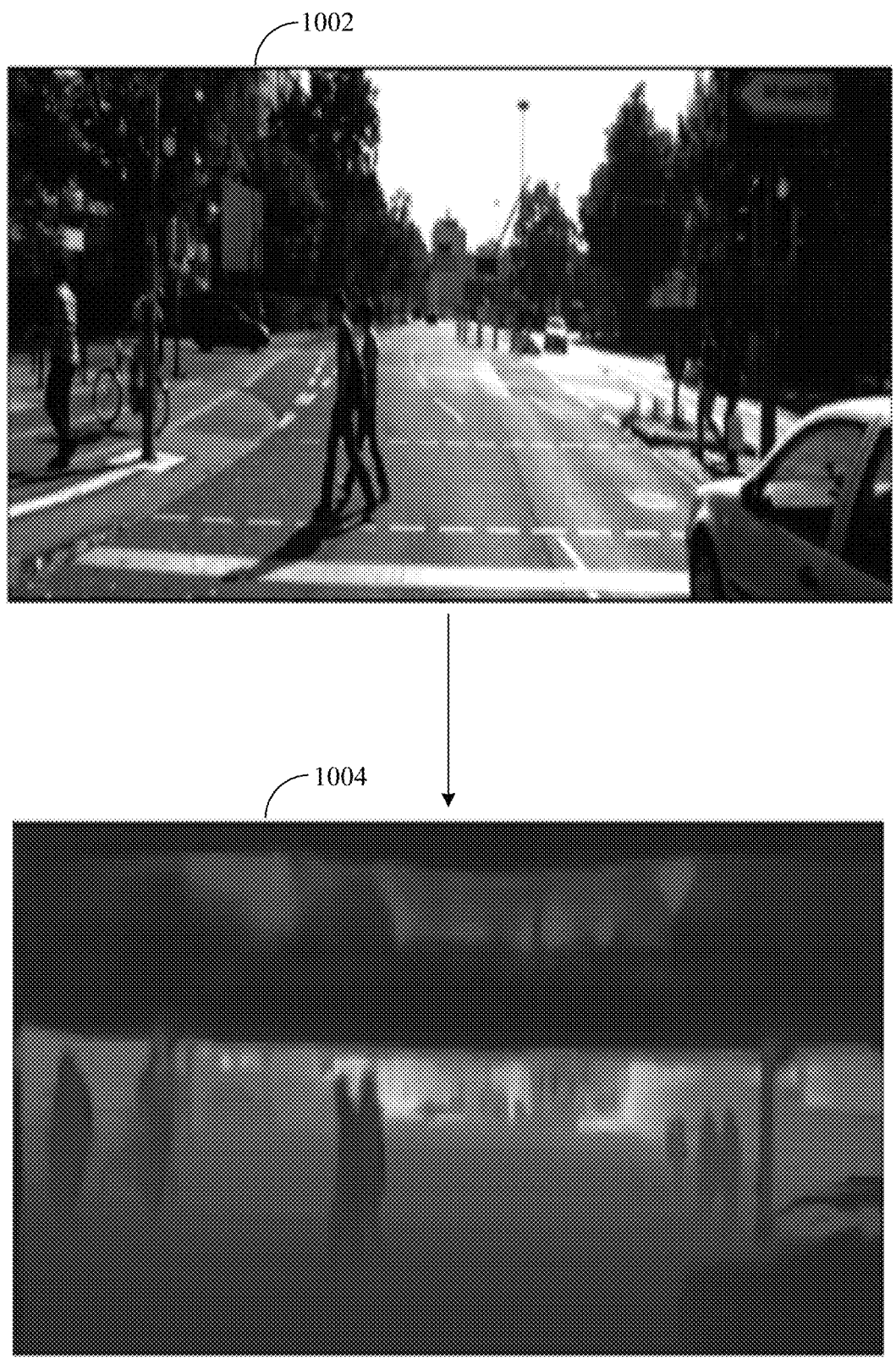
FIG. 10 shows yet another example of qualitative results of an example embodiment.

FIGS. 8-10 show qualitative results of an example system.

FIG. 8 shows a raw camera image 802, which is utilized to generate a depth prediction result 804.

FIG. 9 shows a raw camera image 902, which is utilized to generate a depth prediction result 904.

FIG. 10 shows a raw camera image 1002, which is utilized to generate a depth prediction result 1004.

Figure 11:
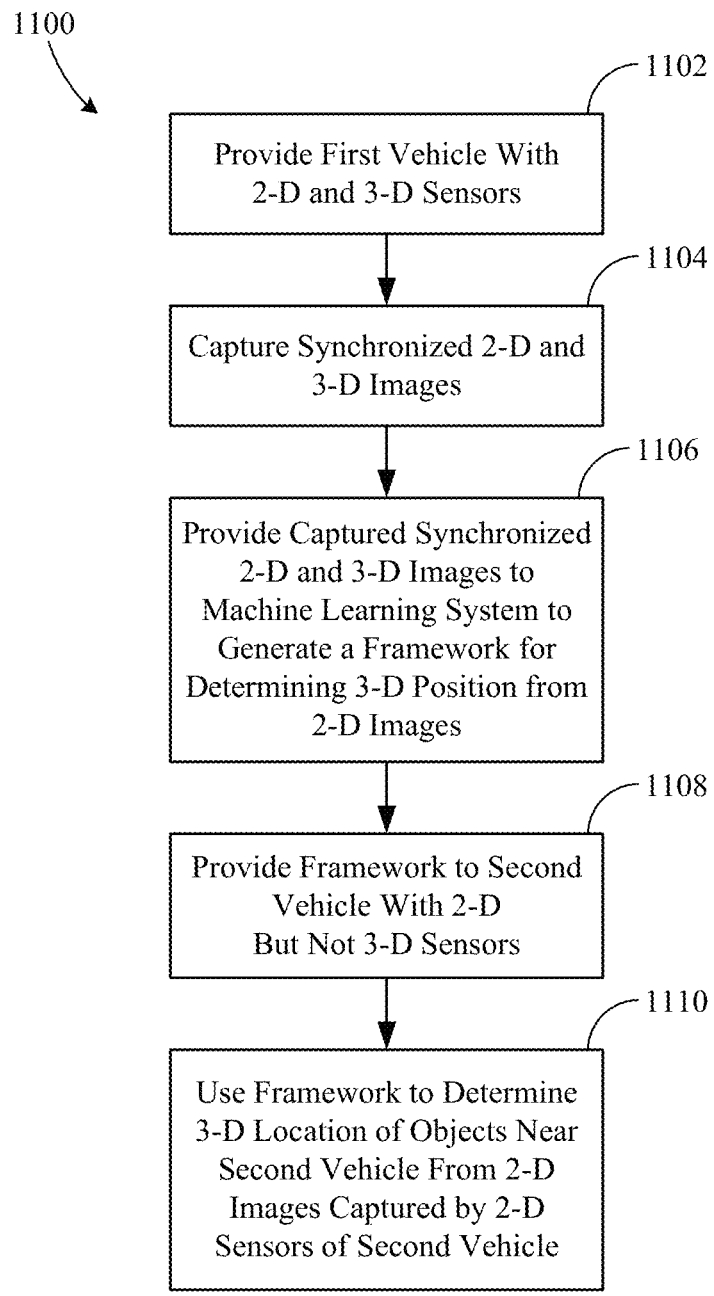
FIG. 11 is a flowchart summarizing an example method for using 2D images to determine the 3D position of objects in the vicinity of an autonomous vehicle.

FIG. 11 is a flowchart summarizing an example method 1100 for using 2D images to determine the 3D position of objects in the vicinity of an autonomous vehicle. In a first step 1102, a first vehicle with both a 2D sensor (e.g., a camera) and 3D sensors (e.g., LiDAR) is provided. Then, in a second step 1104, synchronized 2D and 3D images are captured by the sensors of the first vehicle. Next, in a third step 1106, the synchronized 2D and 3D images are provided to a machine learning system, where they are used to generate a framework for determining the 3D position of objects from one or more 2D images. Then, in a fourth step 1108, the framework is provided to a second vehicle that has one or more 2D sensors. Then, in a fifth step 1110, the framework is used to determine the 3D location of objects in the vicinity of the second vehicle using 2D images captured by the 2D sensors of the second vehicle, but without using any images/data from a 3D sensor.

The above described embodiment proposes a unified architecture that facilitates object detection and depth prediction in an end-to-end manner. In an alternative embodiment, given a depth map predicted for an image by any off-the-shelf depth prediction network (e.g. a deep learning network, such as in reference [10]) and object detections predicted for the same image by a separate object detection network (such as in reference [9]), the z-coordinate can be estimated using the 2D object center and corresponding depth in the regressed depth map.

As an alternative to training a single end-to-end network to predict depth, two separate networks (e.g., depth prediction networks, object detection networks, etc.) could be used to regress the 3D object position. A deep learning architecture that is trained end-to-end to regress depth prediction and object detection jointly is not necessary, but is considered to provide superior results. A combination of any off-the-shelf depth prediction method and object detection method could provide acceptable results in certain circumstances, but might be unacceptable (e.g., less accurate in depth prediction and/or object detection), as compared to the previously described embodiment, in other circumstances.

Figure 12:
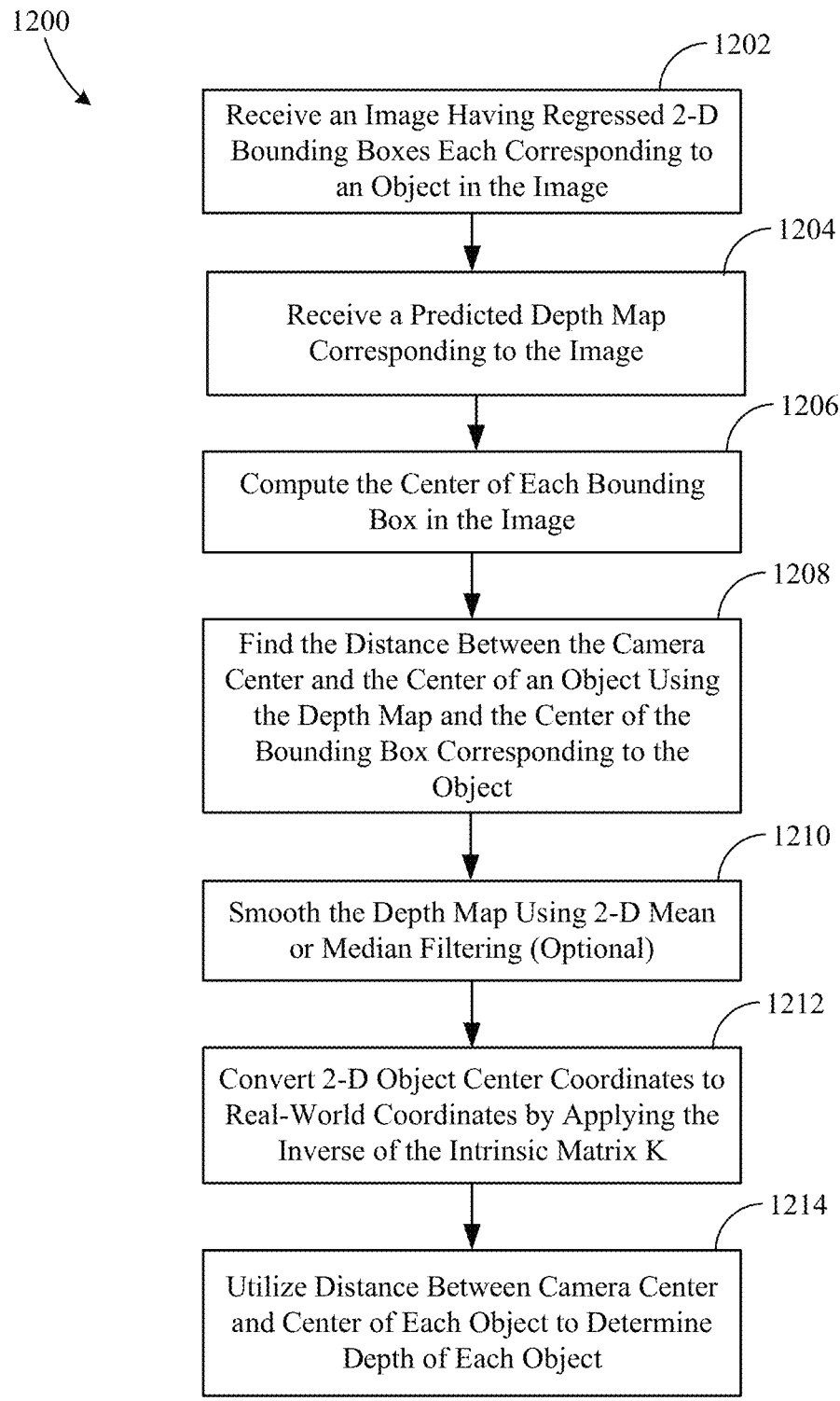
FIG. 12 is a flowchart summarizing another example method for using 2D images and predicted depth maps to determine the 3D position of objects.

FIG. 12 is a flowchart summarizing another example method 1200 for using 2D images and predicted depth maps to determine the 3D position of objects in the vicinity of an autonomous vehicle. Method 1200 utilizes, for example, pre-trained object detection and depth prediction networks to regress 2D detections and predict depth maps, respectively. Further training and/or fine-tuning for adapting the trained model to the current or the inference dataset is optional. Often, training and/or fine-tuning improves performance (i.e. increases accuracy of the predictions) of the method.

In a first step 1202 of method 1200, an image (I) having width (W) and height (H) is received. An object detection network regresses 2D bounding boxes (denoted {x1, y1, x2, y2} or {left, top, right, bottom}) corresponding to each object in the image, either before or after the image is received. In a second step 1204, a predicted depth map (D), corresponding to the image and being the same size (W×H) as the image, is received. Next, in a third step 1206, the center of each bounding box in the image is computed as $$\left\{ \frac{x2-x1}{2}, \frac{y2-y1}{2} \right\},$$

where the x-coordinate denotes the horizontal direction and the y-coordinate denotes the vertical direction. Then, in a fourth step 1208, the distance (d) between the center of the camera and the center of an object is found using the depth map and the center of the bounding box corresponding to the object. For example, the corresponding value in the depth map is found, where $$d = D\left[ \frac{x2-x1}{2}, \frac{y2-y1}{2} \right]$$

(i.e. the value of the depth map at the point representing the center of the object). In an optional fifth step 1210, the depth map (which is often noisy) is smoothed using 2D mean or median filtering. Then, in a sixth step 1212, the center of each object (which is in 2D space) is converted into real-world coordinates. In particular, the inverse of the intrinsic matrix (K) of the camera is applied after undistorting the points. Finally, in a seventh step 1214, the distance between the center of the camera and the center of each object is utilized to determine the depth (z) of each object. In particular, the depth of the object can be computed as one leg of a right triangle of which the distance d comprises the hypotenuse and the distance $$\frac{x2-x1}{2}$$

comprises a leg. The length of the second leg (z) can be calculated according to the Pythagorean theorem, where:

$$z = \sqrt{d^2 - \left(\frac{x2-x1}{2}\right)^2}.$$

The description of particular embodiments of the present invention is now complete. Many of the described features may be substituted, altered or omitted without departing from the scope of the invention. For example, alternate machine learning approaches (e.g., alternate regression techniques), may be substituted for the particular techniques employed. These and other deviations from the particular embodiments shown will be apparent to those skilled in the art, particularly in view of the foregoing disclosure.

We claim:

1. A method for estimating a three-dimensional (3-D) location of an object captured in a two-dimensional (2-D) image, said method comprising:
   acquiring position data indicative of 3-D positions of objects in a space;
   acquiring a 2-D image of said space, said 2-D image including 2-D representations of said objects in said space;
   associating said position data and said 2-D image to create training data;
   providing a machine learning framework;
   using said training data to train said machine learning framework to create a trained machine learning framework capable of determining 3-D positions of target objects represented in 2-D images of target spaces including said target objects;
   obtaining a subsequent 2-D image of a subsequent space; and
   utilizing said trained machine learning framework to determine a 3-D position of an object in said subsequent space; and wherein
   said step of utilizing said trained machine learning framework to determine said 3-D position of an object in said subsequent space includes
      providing said subsequent 2-D image to a first portion of said trained machine learning framework configured to encode said subsequent 2-D image to generate an encoded 2-D image,
      providing said encoded 2-D image to a second portion of said trained machine learning framework configured to determine a 2-D position of said object in said subsequent space,
      providing said encoded 2-D image to a third portion of said trained machine learning framework configured to estimate a depth of said object within said subsequent space, and combining said 2-D position of said object and said depth of said object to estimate a 3-D position of said object within said subsequent space.

2. The method of claim 1, wherein:
said first portion of said trained machine learning framework is configured to generate an encoded tensor based at least in part on said subsequent 2-D image;
said step of providing said encoded 2-D image to said second portion of said trained machine learning framework includes providing said encoded tensor to said second portion of said trained machine learning framework; and
said step of providing said encoded 2-D image to said third portion of said trained machine learning framework includes providing said encoded tensor to said third portion of said trained machine learning framework.

3. The method of claim 2, wherein said first portion of said trained machine learning framework is a deep learning aggregation network configured to encode image features of said subsequent 2-D image to create encoded image features, said encoded image features existing at varying scales.

4. The method of claim 1, wherein said steps of providing said encoded 2-D image to said second portion of said trained machine learning framework and providing said encoded 2-D image to said third portion of said trained machine learning framework occur in parallel.

5. The method of claim 1, further comprising determining a 2-D, real-world position of said object in said subsequent space, and wherein:
said step of obtaining said subsequent 2-D image of said subsequent space includes capturing said subsequent 2-D image with an image capture device, said image capture device being associated with an intrinsic matrix;
said intrinsic matrix represents a relationship between points in an image space of said image capture device and locations in a 3-D world space corresponding to said subsequent space; and
said step of determining said 2-D, real-world position of said object in said subsequent space includes associating points in said image space of said image capture device with locations in said 3-D world space based at least in part on said intrinsic matrix.

6. The method of claim 5, wherein:
said step of combining said 2-D position of said object and said depth of said object to estimate said 3-D position of said object within said subsequent space includes utilizing the Pythagorean theorem to relate said estimated depth of said object, a coordinate of said 2-D position of said object, and a corrected depth of said object;
said estimated depth is a distance between said image capture device and said object as estimated by said third portion of said trained machine learning framework;
said corrected depth is a distance between a first plane perpendicular to an optical axis of said image capture device and intersecting said image capture device and a second plane perpendicular to said optical axis and intersecting said object, said depth of said object representing an estimate of the distance between said image capture device and said object; and
said step of combining said 2-D position of said object and said depth of said object includes calculating said corrected depth based at least in part on said estimated depth, said coordinate, and the Pythagorean theorem.

7. The method of claim 1, wherein:
said step of obtaining said subsequent 2-D image of said subsequent space includes capturing said subsequent image with an image capture device;
said image capture device is coupled to a vehicle;
said subsequent 2-D image is captured at a particular time; and
said subsequent 2-D image is at least partially representative of the surroundings of said vehicle at said particular time.

8. The method of claim 7, further comprising providing said trained machine learning framework to said vehicle, and wherein:
said vehicle is an autonomous vehicle; and
movements of said autonomous vehicle are informed at least in part by said 3-D position of said object.

9. The method of claim 1, wherein said step of using said training data to train said machine learning framework includes:
utilizing said machine learning framework to estimate depths of said objects in said space;
utilizing said machine learning framework to estimate 2-D positions of said objects in said space;
comparing said estimated depths of said objects to observed depths of said objects obtained from said position data;
comparing said estimated 2-D positions of said objects to observed 2-D positions of said objects obtained from position data;
generating a loss function based at least in part on said comparison between said estimated depths of said objects and said observed depths of said objects and based at least in part on said comparison between said estimated 2-D positions of said objects and said observed 2-D positions of said objects; and
altering said machine learning framework based at least in part on said loss function.

10. The method of claim 9, wherein said step of altering said machine learning framework based at least in part on said loss function includes:
calculating a contribution of a node of said machine learning framework to said loss function; and
altering at least one value corresponding to said node of said machine learning framework based at least in part on said contribution of said node to said loss function.

11. The method of claim 1, wherein said position data is light detection and ranging (LiDAR) data.

12. A system configured to estimate a three-dimensional (3-D) location of an object captured in a two-dimensional (2-D) image, said system comprising:
a hardware processor configured to execute code, said code including a set of native instructions for causing said hardware processor to perform a corresponding set of operations when executed by said hardware processor; and
memory for storing data and said code, said data including position data indicative of 3-D positions of objects in a space,
a 2-D image of said space, said 2-D image including 2-D representations of said objects in said space, and
a subsequent 2-D image of a subsequent space; and wherein
said code includes
a machine learning framework,
a first subset of said set of native instructions configured to associate said position data and said 2-D image to create training data, a second subset of said set of native instructions configured to use said training data to train said machine learning framework to create a trained machine learning framework capable of determining 3-D positions of target objects represented in 2-D images of target spaces including said target objects, and a third subset of said set of native instructions configured to cause said trained machine learning framework to determine a 3-D position of an object in said subsequent space, provide said subsequent 2-D image to a first portion of said trained machine learning framework configured to encode said subsequent 2-D image to generate an encoded 2-D image, provide said encoded 2-D image to a second portion of said trained machine learning framework configured to determine a 2-D position of said object in said subsequent space, provide said encoded 2-D image to a third portion of said trained machine learning framework configured to estimate a depth of said object within said subsequent space, and combine said 2-D position of said object and said depth of said object to estimate a 3-D position of said object within said subsequent space.

13. The system of claim 12, wherein:
said first portion of said trained machine learning framework is configured to generate an encoded tensor based at least in part on said subsequent 2-D image;
said third subset of said set of native instructions is additionally configured to provide said encoded tensor to said second portion of said trained machine learning framework; and
said third subset of said set of native instructions is additionally configured to provide said encoded tensor to said third portion of said trained machine learning framework.

14. The system of claim 13, wherein said first portion of said trained machine learning framework is a deep learning aggregation network configured to encode image features of said subsequent 2-D image to create encoded image features, said encoded image features existing at varying scales.

15. The system of claim 12, wherein said third subset of said set of native instructions is additionally configured to provide said encoded 2-D image to said second portion of said trained machine learning framework and to said third portion of said trained machine learning framework in parallel.

16. The system of claim 12, further comprising an image capture device associated with an intrinsic matrix, and wherein:
said code includes a fourth subset of said set of native instructions configured to determine a 2-D, real-world position of said object in said subsequent space;
said subsequent 2-D image is captured by said image capture device;
said intrinsic matrix represents a relationship between points in an image space of said image capture device and locations in a 3-D world space corresponding to said subsequent space; and
said fourth subset of said set of native instructions is additionally configured to associate points in said image space of said image capture device with locations in said 3-D world space based at least in part on said intrinsic matrix.

17. The system of claim 16, wherein:
said third subset of said set of native instructions is additionally configured to utilize the Pythagorean theorem to relate said estimated depth of said object, a coordinate of said 2-D position of said object, and a corrected depth of said object;
said estimated depth is a distance between said image capture device and said object as estimated by said third portion of said trained machine learning framework;
said corrected depth is a distance between a first plane perpendicular to an optical axis of said image capture device and intersecting said image capture device and a second plane perpendicular to said optical axis and intersecting said object, said depth of said object representing an estimate of the distance between said image capture device and said object; and
said third subset of said set of native instructions is additionally configured to calculate said corrected depth based at least in part on said estimated depth, said coordinate, and the Pythagorean theorem.

18. The system of claim 12, further comprising:
a vehicle; and
an image capture device coupled to said vehicle; and wherein said subsequent 2-D image is captured by said image capture device at a particular time; and
said subsequent 2-D image is at least partially representative of the surroundings of said vehicle at said particular time.

19. The system of claim 18, further comprising a network adapter configured to establish a data connection between said hardware processor and said vehicle, and wherein:
said code includes a fourth subset of said set of native instructions configured to provide said trained machine learning framework to said vehicle;
said vehicle is an autonomous vehicle; and
movements of said autonomous vehicle are informed at least in part by said 3-D position of said object.

20. The system of claim 12, wherein said second subset of said set of native instructions is additionally configured to:
utilize said machine learning framework to estimate depths of said objects in said space;
utilize said machine learning framework to estimate 2-D positions of said objects in said space;
compare said estimated depths of said objects to observed depths of said objects obtained from said position data;
compare said estimated 2-D positions of said objects to observed 2-D positions of said objects obtained from position data;
generate a loss function based at least in part on said comparison between said estimated depths of said objects and said observed depths of said objects and at least in part on said comparison between said estimated 2-D positions of said objects and said observed 2-D positions of said objects; and
alter said machine learning framework based at least in part on said loss function.

21. The system of claim 20, wherein said second subset of said set of native instructions is additionally configured to:
calculate a contribution of a node of said machine learning framework to said loss function; and
alter at least one value corresponding to said node of said machine learning framework based at least in part on said contribution of said node to said loss function.

22. The method of claim 12, wherein said position data is light detection and ranging (LiDAR) data.

23. A method for estimating a three-dimensional (3-D) location of an object captured in a two-dimensional (2-D) image, said method comprising:
  acquiring position data indicative of 3-D positions of objects in a space;
  acquiring a 2-D image of said space, said 2-D image including 2-D representations of said objects in said space;
  associating said position data and said 2-D image to create training data;
  providing a machine learning framework;
  using said training data to train said machine learning framework to create a trained machine learning framework capable of determining 3-D positions of target objects represented in 2-D images of target spaces including said target objects;
  obtaining a subsequent 2-D image of a subsequent space; and
  utilizing said trained machine learning framework to determine a 3-D position of an object in said subsequent space; and wherein
  said step of using said training data to train said machine learning framework includes
    utilizing said machine learning framework to estimate depths of said objects in said space,
    utilizing said machine learning framework to estimate 2-D positions of said objects in said space,
    comparing said estimated depths of said objects to observed depths of said objects obtained from said position data,
    comparing said estimated 2-D positions of said objects to observed 2-D positions of said objects obtained from position data,
    generating a loss function based at least in part on said comparison between said estimated depths of said objects and said observed depths of said objects and based at least in part on said comparison between said estimated 2-D positions of said objects and said observed 2-D positions of said objects, and
    altering said machine learning framework based at least in part on said loss function.

24. The method of claim 23, wherein:
  said step of utilizing said trained machine learning framework to determine said 3-D position of said object in said subsequent space includes
    providing said subsequent 2-D image to a first portion of said trained machine learning framework configured to encode said subsequent 2-D image to generate an encoded 2-D image,
    providing said encoded 2-D image to a second portion of said trained machine learning framework configured to determine a 2-D position of said object in said subsequent space,
    providing said encoded 2-D image to a third portion of said trained machine learning framework configured to estimate a depth of said object within said subsequent space, and
    combining said 2-D position of said object and said depth of said object to estimate a 3-D position of said object within said subsequent space;
  said first portion of said trained machine learning framework is configured to generate an encoded tensor based at least in part on said subsequent 2-D image;
  said step of providing said encoded 2-D image to said second portion of said trained machine learning framework includes providing said encoded tensor to said second portion of said trained machine learning framework; and
  said step of providing said encoded 2-D image to said third portion of said trained machine learning framework includes providing said encoded tensor to said third portion of said trained machine learning framework.

25. The method of claim 24, wherein said first portion of said trained machine learning framework is a deep learning aggregation network configured to encode image features of said subsequent 2-D image to create encoded image features, said encoded image features existing at varying scales.

26. The method of claim 23, wherein:
  said step of utilizing said trained machine learning framework to determine said 3-D position of said object in said subsequent space includes
    providing said subsequent 2-D image to a first portion of said trained machine learning framework configured to encode said subsequent 2-D image to generate an encoded 2-D image,
    providing said encoded 2-D image to a second portion of said trained machine learning framework configured to determine a 2-D position of said object in said subsequent space,
    providing said encoded 2-D image to a third portion of said trained machine learning framework configured to estimate a depth of said object within said subsequent space, and
    combining said 2-D position of said object and said depth of said object to estimate a 3-D position of said object within said subsequent space; and
  said steps of providing said encoded 2-D image to said second portion of said trained machine learning framework and providing said encoded 2-D image to said third portion of said trained machine learning framework occur in parallel.

27. The method of claim 23, further comprising determining a 2-D, real-world position of said object in said subsequent space, and wherein:
  said step of utilizing said trained machine learning framework to determine said 3-D position of said object in said subsequent space includes
    providing said subsequent 2-D image to a first portion of said trained machine learning framework configured to encode said subsequent 2-D image to generate an encoded 2-D image,
    providing said encoded 2-D image to a second portion of said trained machine learning framework configured to determine a 2-D position of said object in said subsequent space,
    providing said encoded 2-D image to a third portion of said trained machine learning framework configured to estimate a depth of said object within said subsequent space, and
    combining said 2-D position of said object and said depth of said object to estimate a 3-D position of said object within said subsequent space;
  said step of obtaining said subsequent 2-D image of said subsequent space includes capturing said subsequent 2-D image with an image capture device, said image capture device being associated with an intrinsic matrix;
  said intrinsic matrix represents a relationship between points in an image space of said image capture device and locations in a 3-D world space corresponding to said subsequent space; and said step of determining said 2-D, real-world position of said object in said subsequent space includes associating points in said image space of said image capture device with locations in said 3-D world space based at least in part on said intrinsic matrix.

28. The method of claim 27, wherein:
said step of combining said 2-D position of said object and said depth of said object to estimate said 3-D position of said object within said subsequent space includes utilizing the Pythagorean theorem to relate said estimated depth of said object, a coordinate of said 2-D position of said object, and a corrected depth of said object;
said estimated depth is a distance between said image capture device and said object as estimated by said third portion of said trained machine learning framework;
said corrected depth is a distance between a first plane perpendicular to an optical axis of said image capture device and intersecting said image capture device and a second plane perpendicular to said optical axis and intersecting said object, said depth of said object representing an estimate of the distance between said image capture device and said object; and
said step of combining said 2-D position of said object and said depth of said object includes calculating said corrected depth based at least in part on said estimated depth, said coordinate, and the Pythagorean theorem.

29. The method of claim 23, wherein:
said step of obtaining said subsequent 2-D image of said subsequent space includes capturing said subsequent image with an image capture device;
said image capture device is coupled to a vehicle;
said subsequent 2-D image is captured at a particular time; and
said subsequent 2-D image is at least partially representative of the surroundings of said vehicle at said particular time.

30. The method of claim 29, further comprising providing said trained machine learning framework to said vehicle, and wherein:
said vehicle is an autonomous vehicle; and
movements of said autonomous vehicle are informed at least in part by said 3-D position of said object.

31. The method of claim 23, wherein said step of altering said machine learning framework based at least in part on said loss function includes:
calculating a contribution of a node of said machine learning framework to said loss function; and
altering at least one value corresponding to said node of said machine learning framework based at least in part on said contribution of said node to said loss function.

32. The method of claim 23, wherein said position data is light detection and ranging (LiDAR) data.

33. A system configured to estimate a three-dimensional (3-D) location of an object captured in a two-dimensional (2-D) image, said system comprising:
a hardware processor configured to execute code, said code including a set of native instructions for causing said hardware processor to perform a corresponding set of operations when executed by said hardware processor;
memory for storing data and said code, said data including position data indicative of 3-D positions of objects in a space,
a 2-D image of said space, said 2-D image including 2-D representations of said objects in said space, and a subsequent 2-D image of a subsequent space;
a vehicle;
an image capture device coupled to said vehicle; and
a network adapter configured to establish a data connection between said hardware processor and said vehicle; and wherein
said subsequent 2-D image is captured by said image capture device at a particular time;
said subsequent 2-D image is at least partially representative of the surroundings of said vehicle at said particular time;
said code includes
a machine learning framework,
a first subset of said set of native instructions configured to associate said position data and said 2-D image to create training data,
a second subset of said set of native instructions configured to use said training data to train said machine learning framework to create a trained machine learning framework capable of determining 3-D positions of target objects represented in 2-D images of target spaces including said target objects,
a third subset of said set of native instructions configured to cause said trained machine learning framework to determine a 3-D position of an object in said subsequent space, and
a fourth subset of said set of native instructions configured to provide said trained machine learning framework to said vehicle;
said vehicle is an autonomous vehicle; and
movements of said autonomous vehicle are informed at least in part by said 3-D position of said object.

34. The system of claim 33, wherein:
said third subset of said set of native instructions is additionally configured to
provide said subsequent 2-D image to a first portion of said trained machine learning framework configured to encode said subsequent 2-D image to generate an encoded 2-D image,
provide said encoded 2-D image to a second portion of said trained machine learning framework configured to determine a 2-D position of said object in said subsequent space,
provide said encoded 2-D image to a third portion of said trained machine learning framework configured to estimate a depth of said object within said subsequent space, and
combine said 2-D position of said object and said depth of said object to estimate a 3-D position of said object within said subsequent space;
said first portion of said trained machine learning framework is configured to generate an encoded tensor based at least in part on said subsequent 2-D image;
said third subset of said set of native instructions is additionally configured to provide said encoded tensor to said second portion of said trained machine learning framework; and
said third subset of said set of native instructions is additionally configured to provide said encoded tensor to said third portion of said trained machine learning framework.

35. The system of claim 34, wherein said first portion of said trained machine learning framework is a deep learning aggregation network configured to encode image features of said subsequent 2-D image to create encoded image features, said encoded image features existing at varying scales.

36. The system of claim 33, wherein said third subset of said set of native instructions is additionally configured to:
provide said subsequent 2-D image to a first portion of said trained machine learning framework configured to encode said subsequent 2-D image to generate an encoded 2-D image;
provide said encoded 2-D image to a second portion of said trained machine learning framework configured to determine a 2-D position of said object in said subsequent space;
provide said encoded 2-D image to a third portion of said trained machine learning framework configured to estimate a depth of said object within said subsequent space;
combine said 2-D position of said object and said depth of said object to estimate a 3-D position of said object within said subsequent space; and
provide said encoded 2-D image to said second portion of said trained machine learning framework and to said third portion of said trained machine learning framework in parallel.

37. The system of claim 33, further comprising an image capture device associated with an intrinsic matrix, and wherein:
said third subset of said set of native instructions is additionally configured to
provide said subsequent 2-D image to a first portion of said trained machine learning framework configured to encode said subsequent 2-D image to generate an encoded 2-D image,
provide said encoded 2-D image to a second portion of said trained machine learning framework configured to determine a 2-D position of said object in said subsequent space,
provide said encoded 2-D image to a third portion of said trained machine learning framework configured to estimate a depth of said object within said subsequent space, and
combine said 2-D position of said object and said depth of said object to estimate a 3-D position of said object within said subsequent space;
said code includes a fourth subset of said set of native instructions configured to determine a 2-D, real-world position of said object in said subsequent space;
said subsequent 2-D image is captured by said image capture device;
said intrinsic matrix represents a relationship between points in an image space of said image capture device and locations in a 3-D world space corresponding to said subsequent space; and
said fourth subset of said set of native instructions is additionally configured to associate points in said image space of said image capture device with locations in said 3-D world space based at least in part on said intrinsic matrix.

38. The system of claim 37, wherein:
said third subset of said set of native instructions is additionally configured to utilize the Pythagorean theorem to relate said estimated depth of said object, a coordinate of said 2-D position of said object, and a corrected depth of said object;
said estimated depth is a distance between said image capture device and said object as estimated by said third portion of said trained machine learning framework;

said corrected depth is a distance between a first plane perpendicular to an optical axis of said image capture device and intersecting said image capture device and a second plane perpendicular to said optical axis and intersecting said object, said depth of said object representing an estimate of the distance between said image capture device and said object; and
said third subset of said set of native instructions is additionally configured to calculate said corrected depth based at least in part on said estimated depth, said coordinate, and the Pythagorean theorem.

39. The system of claim 33, wherein said second subset of said set of native instructions is additionally configured to:
utilize said machine learning framework to estimate depths of said objects in said space;
utilize said machine learning framework to estimate 2-D positions of said objects in said space;
compare said estimated depths of said objects to observed depths of said objects obtained from said position data;
compare said estimated 2-D positions of said objects to observed 2-D positions of said objects obtained from position data;
generate a loss function based at least in part on said comparison between said estimated depths of said objects and said observed depths of said objects and at least in part on said comparison between said estimated 2-D positions of said objects and said observed 2-D positions of said objects; and
alter said machine learning framework based at least in part on said loss function.

40. The system of claim 39, wherein said second subset of said set of native instructions is additionally configured to:
calculate a contribution of a node of said machine learning framework to said loss function; and
alter at least one value corresponding to said node of said machine learning framework based at least in part on said contribution of said node to said loss function.

41. The method of claim 33, wherein said position data is light detection and ranging (LiDAR) data.

42. A system configured to estimate a three-dimensional (3-D) location of an object captured in a two-dimensional (2-D) image, said system comprising:
a hardware processor configured to execute code, said code including a set of native instructions for causing said hardware processor to perform a corresponding set of operations when executed by said hardware processor; and
memory for storing data and said code, said data including position data indicative of 3-D positions of objects in a space,
a 2-D image of said space, said 2-D image including 2-D representations of said objects in said space, and
a subsequent 2-D image of a subsequent space; and wherein
said code includes
a machine learning framework,
a first subset of said set of native instructions configured to associate said position data and said 2-D image to create training data,
a second subset of said set of native instructions configured to
use said training data to train said machine learning framework to create a trained machine learning framework capable of determining 3-D positions of target objects represented in 2-D images of target spaces including said target objects, utilize said machine learning framework to estimate depths of said objects in said space,
utilize said machine learning framework to estimate 2-D positions of said objects in said space,
compare said estimated depths of said objects to observed depths of said objects obtained from said position data,
compare said estimated 2-D positions of said objects to observed 2-D positions of said objects obtained from position data,
generate a loss function based at least in part on said comparison between said estimated depths of said objects and said observed depths of said objects and at least in part on said comparison between said estimated 2-D positions of said objects and said observed 2-D positions of said objects, and
alter said machine learning framework based at least in part on said loss function, and
a third subset of said set of native instructions configured to cause said trained machine learning framework to determine a 3-D position of an object in said subsequent space.

43. The system of claim 42, wherein:
said third subset of said set of native instructions is additionally configured to
provide said subsequent 2-D image to a first portion of said trained machine learning framework configured to encode said subsequent 2-D image to generate an encoded 2-D image,
provide said encoded 2-D image to a second portion of said trained machine learning framework configured to determine a 2-D position of said object in said subsequent space,
provide said encoded 2-D image to a third portion of said trained machine learning framework configured to estimate a depth of said object within said subsequent space, and
combine said 2-D position of said object and said depth of said object to estimate a 3-D position of said object within said subsequent space;
said first portion of said trained machine learning framework is configured to generate an encoded tensor based at least in part on said subsequent 2-D image;
said third subset of said set of native instructions is additionally configured to provide said encoded tensor to said second portion of said trained machine learning framework; and
said third subset of said set of native instructions is additionally configured to provide said encoded tensor to said third portion of said trained machine learning framework.

44. The system of claim 43, wherein said first portion of said trained machine learning framework is a deep learning aggregation network configured to encode image features of said subsequent 2-D image to create encoded image features, said encoded image features existing at varying scales.

45. The system of claim 42, wherein said third subset of said set of native instructions is additionally configured to:
provide said subsequent 2-D image to a first portion of said trained machine learning framework configured to encode said subsequent 2-D image to generate an encoded 2-D image;
provide said encoded 2-D image to a second portion of said trained machine learning framework configured to determine a 2-D position of said object in said subsequent space;
provide said encoded 2-D image to a third portion of said trained machine learning framework configured to estimate a depth of said object within said subsequent space;
combine said 2-D position of said object and said depth of said object to estimate a 3-D position of said object within said subsequent space; and
provide said encoded 2-D image to said second portion of said trained machine learning framework and to said third portion of said trained machine learning framework in parallel.

46. The system of claim 42, further comprising an image capture device associated with an intrinsic matrix, and wherein:
said third subset of said set of native instructions is additionally configured to
provide said subsequent 2-D image to a first portion of said trained machine learning framework configured to encode said subsequent 2-D image to generate an encoded 2-D image,
provide said encoded 2-D image to a second portion of said trained machine learning framework configured to determine a 2-D position of said object in said subsequent space,
provide said encoded 2-D image to a third portion of said trained machine learning framework configured to estimate a depth of said object within said subsequent space, and
combine said 2-D position of said object and said depth of said object to estimate a 3-D position of said object within said subsequent space;
said code includes a fourth subset of said set of native instructions configured to determine a 2-D, real-world position of said object in said subsequent space;
said subsequent 2-D image is captured by said image capture device;
said intrinsic matrix represents a relationship between points in an image space of said image capture device and locations in a 3-D world space corresponding to said subsequent space; and
said fourth subset of said set of native instructions is additionally configured to associate points in said image space of said image capture device with locations in said 3-D world space based at least in part on said intrinsic matrix.

47. The system of claim 46, wherein:
said third subset of said set of native instructions is additionally configured to utilize the Pythagorean theorem to relate said estimated depth of said object, a coordinate of said 2-D position of said object, and a corrected depth of said object;
said estimated depth is a distance between said image capture device and said object as estimated by said third portion of said trained machine learning framework;
said corrected depth is a distance between a first plane perpendicular to an optical axis of said image capture device and intersecting said image capture device and a second plane perpendicular to said optical axis and intersecting said object, said depth of said object representing an estimate of the distance between said image capture device and said object; and
said third subset of said set of native instructions is additionally configured to calculate said corrected depth based at least in part on said estimated depth, said coordinate, and the Pythagorean theorem.

48. The system of claim 42, further comprising:
a vehicle; and
an image capture device coupled to said vehicle; and wherein
said subsequent 2-D image is captured by said image capture device at a particular time; and
said subsequent 2-D image is at least partially representative of the surroundings of said vehicle at said particular time.

49. The system of claim 42, wherein said second subset of said set of native instructions is additionally configured to:
calculate a contribution of a node of said machine learning framework to said loss function; and
alter at least one value corresponding to said node of said machine learning framework based at least in part on said contribution of said node to said loss function.

50. The method of claim 42, wherein said position data is light detection and ranging (LiDAR) data.

* * * * *